United States Patent
Huang et al.

(10) Patent No.: US 11,599,392 B1
(45) Date of Patent: Mar. 7, 2023

(54) HYBRID CLOUD/CAMERA AI COMPUTER VISION SYSTEM

(71) Applicant: Kuna Systems Corporation, San Bruno, CA (US)

(72) Inventors: Haomiao Huang, Redwood City, CA (US); Sean Keenan, Sunnyvale, CA (US)

(73) Assignee: KUNA SYSTEMS CORPORATION, San Mateo, CA (US)

( * ) Notice: Subject to any disclaimer, the term of this patent is extended or adjusted under 35 U.S.C. 154(b) by 850 days.

(21) Appl. No.: 16/540,309

(22) Filed: Aug. 14, 2019

(51) Int. Cl.
| | |
|---|---|
| G06F 9/38 | (2018.01) |
| G06F 9/50 | (2006.01) |
| G06F 9/54 | (2006.01) |
| H04L 67/10 | (2022.01) |
| G06N 3/04 | (2023.01) |
| G06V 10/22 | (2022.01) |

(52) U.S. Cl.
CPC ............ *G06F 9/505* (2013.01); *G06F 9/3877* (2013.01); *G06F 9/546* (2013.01); *G06N 3/0454* (2013.01); *G06V 10/225* (2022.01); *H04L 67/10* (2013.01)

(58) Field of Classification Search
CPC .................................................. G06F 9/3877
See application file for complete search history.

(56) References Cited

U.S. PATENT DOCUMENTS

| | | | |
|---|---|---|---|
| 9,948,902 B1* | 4/2018 | Trundle | G06V 20/52 |
| 10,887,507 B2* | 1/2021 | Beach | G06K 9/6273 |
| 2009/0141939 A1* | 6/2009 | Chambers | G06V 10/255 |
| | | | 382/103 |
| 2018/0173971 A1* | 6/2018 | Jia | G06N 3/0454 |
| 2019/0313024 A1* | 10/2019 | Selinger | H04N 5/23241 |
| 2020/0342258 A1* | 10/2020 | Uno | G06V 10/82 |
| 2021/0274133 A1* | 9/2021 | Madden | H04N 7/183 |

\* cited by examiner

*Primary Examiner* — Jacob Petranek
(74) *Attorney, Agent, or Firm* — Christopher P. Maiorana, PC

(57) ABSTRACT

A system including a smart camera and a server computer. The smart camera may be configured to capture video data comprising a plurality of video frames, detect a triggering event and select a plurality of images from the plurality of video frames of the video data in response to the triggering event and communicate the plurality of images. The server computer may be configured to receive the plurality of images, analyze the plurality of images to perform an additional detection corresponding to the triggering event and generate a signal in response to the additional detection. The server computer may implement a neural network for analyzing the plurality of images. The neural network may use more computing resources than the smart camera uses for detecting the triggering event. Communicating the plurality of images may use less bandwidth than communicating the video data.

20 Claims, 14 Drawing Sheets

HYBRID CLOUD/CAMERA AI COMPUTER VISION SYSTEM

This application relates to U.S. Ser. No. 16/280,377, filed Feb. 20, 2019, which relates to U.S. Ser. No. 16/143,853, filed Sep. 27, 2018, which relates to U.S. Ser. No. 16/111,669, filed Aug. 24, 2018, which relates to U.S. Provisional Application No. 62/661,341, filed Apr. 23, 2018. This application also relates to U.S. Ser. No. 16/252,841, filed Jan. 21, 2019. Each of the mentioned applications are hereby incorporated by reference in their entirety.

FIELD OF THE INVENTION

The invention relates to security devices generally and, more particularly, to a method and/or apparatus for implementing hybrid cloud/camera AI computer vision system.

BACKGROUND

Advanced artificial intelligence based on technologies like deep neural networks are used for tasks such as object recognition in video. Neural networks are very powerful, but the power of neural networks come at the expense of significant processing requirements. Many neural networks are powered by expensive servers that run in the cloud. Services that utilize neural networks have to pay for access to the cloud based on how much processing time is used. The cost of constantly processing video from cloud-connected cameras can become prohibitively expensive. Furthermore, constantly processing video involves large time delays in getting the video loaded into the cloud servers and then processed.

Conventional technology for processing video using neural networks is implemented by having smart cameras constantly stream video to the cloud service. Uploaded video is then processed by the servers and results can be sent back to the smart cameras. Constantly uploading and processing video allows for full accuracy (i.e., best-case accuracy based on current technology) from powerful server-only neural network models and also allows notifications of detected events to be sent out in real time. However, constantly uploading and processing video is expensive both in terms of bandwidth usage and server compute resources.

An alternative conventional technology that saves some bandwidth usage and server compute resources starts a video stream upload after a motion trigger is detected by the smart camera. Waiting until a motion trigger is detected causes a delay in detection by the neural network by multiple seconds. Additionally, starting a video stream upload takes some non-negligible amount of time. Starting a video stream upload after a motion event can lead to the subject of the motion trigger already being out of view of the smart camera by the time the cloud server receives the video data. Sending the video data to the cloud server also takes time, which makes providing real time notifications unlikely without constant video streaming.

Another alternative conventional technology is to modify or compress the neural network to be run on the embedded circuitry of the smart camera devices. Running simplified neural network models on the smart camera eliminates the cloud server cost and the delay in transmitting the video data to the cloud server. However, operating a neural network without the processing power provided by the neural network cloud service requires reducing the size and complexity of the models. The reduced complexity used to operate the neural network on the smart camera also reduces predictive power and accuracy of detections. A neural network run on-device by the smart camera will not be nearly as powerful or accurate as the neural network enabled by the cloud service.

It would be desirable to implement hybrid cloud/camera AI computer vision system.

SUMMARY

The invention concerns a system including a smart camera and a server computer. The smart camera may be configured to capture video data comprising a plurality of video frames, detect a triggering event and select a plurality of images from the plurality of video frames of the video data in response to the triggering event and communicate the plurality of images. The server computer may be configured to receive the plurality of images, analyze the plurality of images to perform an additional detection corresponding to the triggering event and generate a signal in response to the additional detection. The server computer may implement a neural network for analyzing the plurality of images. The neural network may use more computing resources than the smart camera uses for detecting the triggering event. Communicating the plurality of images may use less bandwidth than communicating the video data.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing hybrid cloud/camera AI computer vision system that may (i)

reduce the amount of data transferred, (ii) reduce a load on a service that provides a neural network, (iii) provide robust data transfer and processing, (iv) enable object analysis to be initiated faster than using a video stream, (v) enable object detection using a neural network, (vi) detect trigger events, (vii) provide feedback about settings used to detect trigger events, (viii) convert video frames to a format that reduces data uploaded, (ix) implement a video buffer to ensure video frames from before and after a trigger event are stored, (x) dynamically adjust to the load of incoming images and/or (xi) be implemented as one or more integrated circuits.

Figure 1:
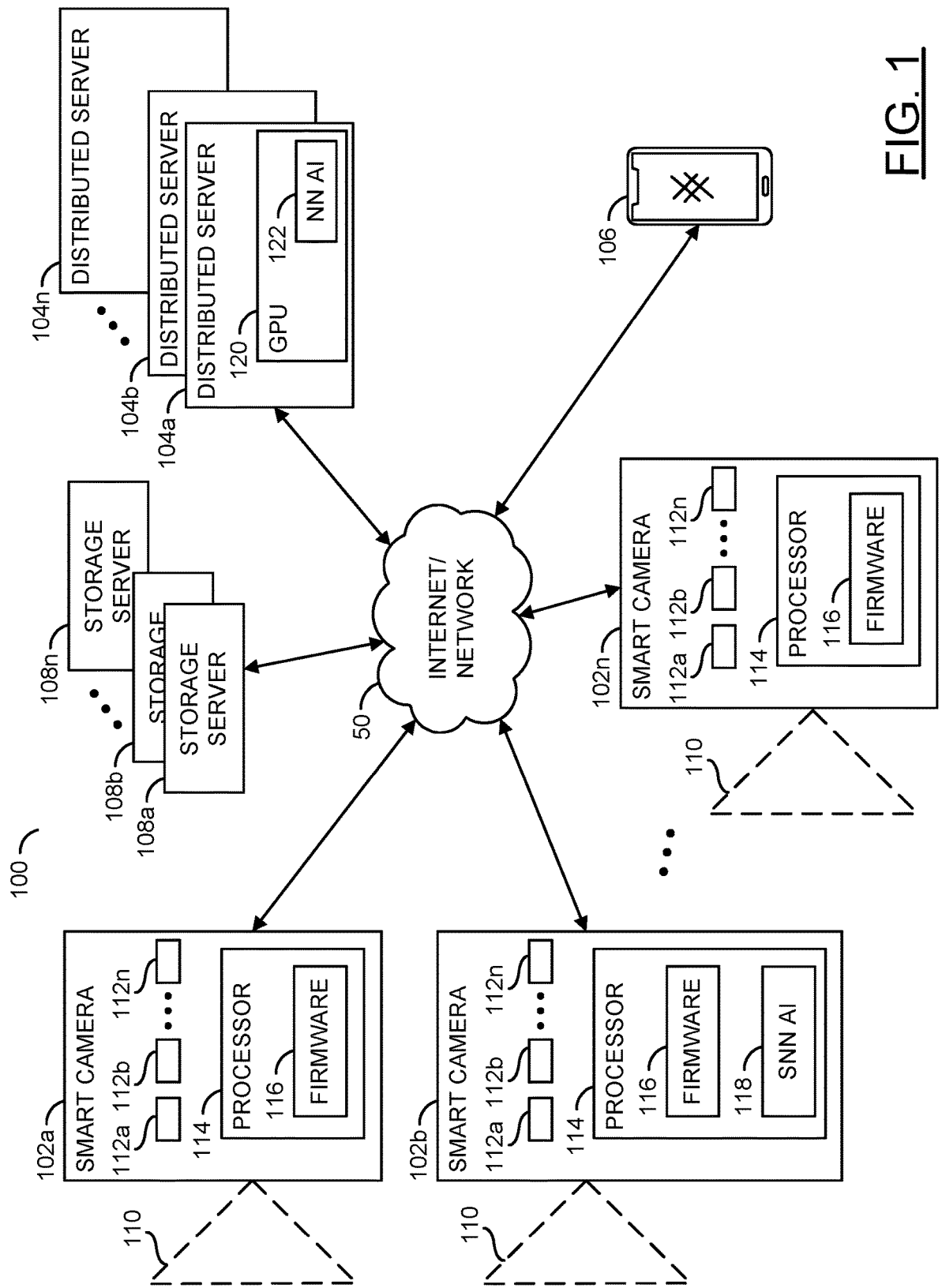
FIG. 1 is a diagram illustrating a system according to an embodiment of the present invention.

Referring to FIG. 1, a diagram illustrating a system according to an embodiment of the present invention is shown. The system 100 is shown. The system 100 may implement a hybrid system that uses multiple layers of detections to detect and/or classify objects in real time. Using multiple layers of detections may enable the system 100 to restrain an amount of data that may be uploaded to a cloud-based server that implements an advanced neural network. Restraining the amount of data uploaded may enable object detection to be performed while conserving server compute resources and limiting an amount of bandwidth for data transmission.

The system 100 may comprise a network 50, blocks (or circuits) 102a-102n, blocks (or circuits) 104a-104n, a block (or circuit) 106 and/or blocks (or circuits) 108a-108n. The network 50 may be a local network and/or a wide area network. For example, the network 50 may be the internet. The circuits 102a-102n may implement smart cameras. The circuits 104a-104n may implement a distributer server (e.g., a cluster of server computers). The circuit 106 may implement a user device. The circuits 108a-108n may implement storage servers. The system 100 may comprise other components (not shown). The number, type and/or arrangement of the components of the system 100 may be varied according to the design criteria of a particular implementation.

The smart cameras 102a-102n may be configured to capture video data. A dotted shape 110 is shown extending from each of the smart cameras 102A-102n, The dotted shape 110 may represent one field of view (e.g., a boundary, a range, etc.) captured by a capture device (e.g., a camera) implemented by each of the smart cameras 102a-102n. The video data may comprise video frames and/or images of the field of view 110. In the example shown, each of the smart cameras 102a-102n may have one field of view 110. However, one or more of the smart cameras 102a-102n may capture more than one field of view (e.g., implement dual cameras, implement a multi-camera system, etc.).

Each of the smart cameras 102a-102n are shown comprising blocks (or circuits) 112a-112n and/or a block (or circuit) 114. The circuits 112a-112n may implement various components of the smart cameras 102a-102n that enable functionality and/or features of the smart cameras 102a-102n. The circuit 114 may implement a processor. The smart cameras 102a-102n may comprise other components (not shown). In some embodiments each of the smart cameras 102a-102n may have differing capabilities and/or features. The number, type and/or arrangement of the components of the smart cameras 102a-102n. Details of the smart cameras 102a-102n may be described in association with FIGS. 2-4.

The components 112a-112n may be configured to monitor and/or sense the environment near the smart cameras 102a-102n. For example, one or more of the components 112a-112n may be sensors. In an example, one of the components 112a-112n may be an image sensor configured to capture video frames. One or more of the components 112a-112n may be configured store and/or communicate data. In one example, one or more of the components 112a-112n may be a memory. In another example, one or more of the components 112a-112n may be a communication device configured to upload information to the internet 50.

The processor 114 may be configured to read information from the components 112a-112n, write information to the components 112a-112n and/or execute computer readable instructions. In one example, the processor 114 may be a video processor. The processor 114 may be configured to perform video processing operations to generate video frames. The processor 114 may be configured to select still images from the video frames to upload to the distributed servers 104a-104n. The processing capability of processor 114 may be limited due to size constraints, power constraints, cost constraints, etc.

The processor 114 may comprise a block (or circuit) 116. The block 116 may be a firmware for the processor 114. The firmware 116 may configure how the processor 114 interacts with the components 112a-112n and/or the input/output generated by the processor 114. The smart cameras 102a-102n may operate based on the firmware 116. Updating the firmware 116 may alter functionality and/or features performed by the smart cameras 102a-102n. In some embodiments, the smart cameras 102a-102n may be updated to operate with the system 100 by updating the firmware 116.

One or more of the smart cameras 102a-102n may comprise a block (or circuit) 118. In the example shown, only the smart camera 102b is shown comprising the block 118. The block 118 may be a module of the processor 114. The module 118 may be a neural network. For example, the processor 114 may implement a neural network artificial intelligence. The neural network artificial intelligence 118 may be configured to detect objects in the video frames generated by the processor 114.

The processor 114 may be configured to detect one or more triggering events. The triggering events may occur when a particular input is determined to be above some pre-determined threshold value. The processor 114 may analyze input detected by one or more of the components 112a-112n to determine whether the detected input is above the pre-determined threshold. In one example, if one of the components 112a-112n is a passive infrared (PIR) sensor configured to detect motion, then the triggering event may be when the processor 114 determines that the input from the PIR sensor is above a threshold for motion. In another example, if one of the components 112a-112n is a microphone, then the triggering event may be when the processor 114 determines that the incoming audio is above a particular audio level and/or matches a particular frequency pattern.

In some embodiments, the triggering event may occur in response to an output of the processor 114. For example, the processor 114 may be configured to analyze video frames generated by the processor 114. In one example, the processor 114 may be configured to analyze the video frames for a particular amount of motion and/or a change in the amount of light to detect a triggering event (e.g., an amount of motion above a threshold amount of motion). In another example, the processor 114 may use the neural network artificial intelligence module 118 to determine whether the video frame has captured a particular type of object (e.g., a person, an animal, a vehicle, a package, etc.) to detect the triggering event. The type of input and/or the threshold for the triggering event may be varied according to the design criteria of a particular implementation.

The distributed servers 104a-104n may be configured to provide computational resources. The distributed servers 104a-104n may be provided as a service. The distributed servers 104a-104n may not be dedicated to the system 100 (e.g., multiple end-users may access the computational resources of the distributed servers 104a-104n). The distributed servers 104a-104n may provide tiered services to enable access to the computational resources. Access to the computational resources of the distributed servers 104a-104n may be fee-based (e.g., based on an amount of computational resources used at one time, based on how long the computational resources are used, based on a percentage usage of the computational resources, etc.). For example, when an end-user accesses more of the computational resources of the distributed servers 104a-104n, then more fees may be charged. Generally, the system 100 may keep fees lower by restraining usage of the computational resources of the distributed servers 104a-104n (e.g., providing selected images instead of a full video stream).

The distributed servers 104a-104n may each comprise a block (or circuit) 120. The circuit 120 may be a graphics processing unit (e.g., a video card). The graphics processing unit 120 may comprise a block (or circuit or module) 122. The module 122 may be a neural network artificial intelligence module. For example, the graphics processing unit 120 may be customized to perform neural network operations of the neural network artificial intelligence module (e.g., a dedicated neural network card). The distributed servers 104a-104n may comprise other components (such as a CPU, RAM, storage, etc., not shown). The number, type and/or arrangement of the components of the distributed servers 104a-104n may be varied according to the design criteria of a particular implementation.

The neural network artificial intelligence module 122 may be configured to perform a detection. In an example, the smart cameras 102a-102n may perform an initial detection to detect the triggering event. The neural network artificial intelligence module 122 may perform a second (e.g., additional) detection. The neural network artificial intelligence module 122 may be configured to perform advanced image analysis (e.g., object detection, object classification, facial recognition, computer vision, etc.) corresponding to the triggering event. In an example, the advanced image analysis may be configured to not only detect that a person is in the video frame but also that the person is a mail carrier (e.g., wearing a uniform, carrying a package, etc.). In another example, the advanced image analysis may be configured to not only detect that a vehicle is in the video frame but also detect the make and model of the vehicle. The advanced image analysis performed by the neural network artificial intelligence module 122 may use more computing resources than the computing resources used by the smart cameras 102a-102n to detect the triggering event. In an example, the advanced image analysis may use more computing resources than the processor 114 for analyzing the video frames for a particular amount of motion and/or a change in the amount of light to detect the triggering event (e.g., an amount of motion above a threshold amount of motion) and/or reading the input detected by the sensors 112a-112n.

The neural network artificial intelligence module 122 may be more effective (e.g., accurate) at detecting objects and/or recognizing characteristics of objects in video frames than the simple neural network artificial intelligence module 118 that may be implemented by one or more of the smart cameras 102a-102n. For example, the smart cameras 102a-102n may not implement the dedicated GPU 120. The neural network artificial intelligence module 122 may consume more power and/or more processing resources than the simple neural network module 118 of the smart cameras 102a-102n. For example, the simple neural network module 118 may be a modified and/or compressed version of the neural network module 122. The compressed simple neural network module 118 may have a reduced size and/or complexity to enable execution on the processor 114. The compressed simple neural network module 118 may use less computing resources than the neural network module 122. However, the reduced size and/or complexity of the simple neural network module 118 may result in less predictive power and/or accuracy than using the neural network module 118.

The user device 106 may be configured to enable a user (e.g., a homeowner) to interact with the system 100. For example, the circuit 106 may have a wired and/or wireless connection to the network 50 and/or the smart cameras 102a-102n. In some embodiments, the user device 106 may be separated from the smart cameras 102a-102n by long distances (e.g., miles). In the example shown, the user device 106 may be a smartphone (e.g., a handheld or portable user device). In some embodiments, the user device 106 may be implemented as a desktop computer, a laptop computer, a smart watch, a tablet computing device, etc. Generally, the user device 106 may be a device configured to communicate wirelessly, display video content and/or receive/transmit audio. The type of device implemented as the user device 106 may be varied according to the design criteria of a particular implementation.

The smart cameras 102a-102n may be configured to wirelessly communicate the video data (e.g., one or more video streams) to the user device 106. In an example, the processor 114 may be configured to format the video streams to be communicated and/or establish a wireless communication link between the smart cameras 102a-102n and the user device 106 (e.g., using Wi-Fi, cellular communication such as 3G/4G/LTE/5G, Bluetooth, etc.). Video streams and/or other data may be transmitted between the smart cameras 102a-102n and the user device 106 (e.g., instructions and/or commands may be sent from the smartphone 106 to one or more of the smart cameras 102a-102n, audio for implementing a two-way intercom may be transmitted, information about objects detected by video analysis performed by the distributed servers 104a-104n may be transmitted to the smartphone 106, etc.). The type of information communicated, and/or the wireless communication protocol(s) implemented may be varied according to the design criteria of a particular implementation.

The storage servers 108a-108n may be configured to provide storage resources. The storage servers 108a-108n may be implemented as a remote server computer. The storage servers 108a-108n may be provide as a service. The storage servers 108a-108n may not be dedicated to the system 100 (e.g., multiple end-users may access the storage resources of the storage servers 108a-108n). For example, the storage servers 108a-108n may comprise multiple, redundant storage media (e.g., hard disk drives, solid state drives, etc.) to enable multiple end-users to access data stored across the storage servers 108a-108n. Access to the storage resources of the storage servers 108a-108n may be fee-based (e.g., based on an amount of total storage resources used).

Generally, storage resources provided by the storage servers 108a-108n are less expensive than the computing resources provided by the distributed servers 108a-108n. For example, the video data generated by the smart cameras 102a-102n may be stored by the storage servers 108a-108n at a less expensive fee than using the neural network artificial intelligence module 122 to analyze the same amount of video data with the distributed servers 104a-

104*n*. The system 100 may be less restrictive with storing video data in the storage servers 108*a*-108*n* than with processing the video data in the distributed servers 104*a*-104*n*.

The distributed servers 104*a*-104*n* and/or the storage servers 108*a*-108*n* may be configured to store data, retrieve and transmit stored data, process data and/or communicate with other devices. The distributed servers 104*a*-104*n* and/or the storage servers 108*a*-108*n* may be implemented as part of a cloud computing platform (e.g., distributed computing). In an example, the distributed servers 104*a*-104*n* and/or the storage servers 108*a*-108*n* may be implemented as a group of cloud-based, scalable server computers. By implementing a number of scalable servers, additional resources (e.g., power, processing capability, memory, etc.) may be available to process and/or store variable amounts of data. For example, the distributed servers 104*a*-104*n* and/or the storage servers 108*a*-108*n* may be configured to scale (e.g., provision resources) based on demand. The distributed servers 104*a*-104*n* and/or the storage servers 108*a*-108*n* may implement scalable computing (e.g., cloud computing). The scalable computing may be available as a service to allow access to processing and/or storage resources without having to build infrastructure (e.g., the provider of the system 100 may not have to build the infrastructure of the distributed servers 104*a*-104*n* and/or the storage servers 108*a*-108*n*). In some embodiments, a same cloud-services provider may provide both the distributed servers 104*a*-104*n* and/or the storage servers 108*a*-108*n*.

The smart cameras 102*a*-102*n* may be configured to detect triggering events in real-time. The triggering events may be detected based on thresholds that are less computationally intensive than the object detection performed by the neural network artificial intelligence module 122. When the processor 114 detects one or more triggering events, the processor 114 may select still images from the video data. The still images may be uploaded by the smart cameras 102*a*-102*n* to the distributed servers 104*a*-104*n*. The still images may be selected at a rate less than the video frame rate of the smart cameras 102*a*-102*n*. The still images may be a subset of the video frames. For example, the still images may provide a sample of the video data captured by the smart cameras 102*a*-102*n* instead of uploading the full video.

The still images may be uploaded amongst the distributed servers 104*a*-104*n*. For example, if the triggering event is detected by the sensor 112*c* of the smart camera 102*a*, then the processor 114 may select still images that correspond to the time that the triggering event was detected by the sensor 112*c*. The still images may be uploaded by the smart camera 102*a* to the distributed servers 104*a*-104*n*. The still images may be distributed among multiple server computers of the distributed servers 104*a*-104*n* that run the AI models 122.

The distributed servers 104*a*-104*n* may be configured to process the still images using the neural network AI modules 122. The distributed servers 104*a*-104*n* may generate a response based on the results of analyzing the still images using the neural network AI modules 122. In one example, if the neural network AI modules 122 do not detect an object, the distributed servers 104*a*-104*n* may generate a response that notifies the smart cameras 102*a*-102*n* to not upload the video data to the storage servers 108*a*-108*n*. In another example, if the neural network AI modules 122 do not detect an object, the distributed servers 104*a*-104*n* may determine why the triggering event detected by the smart cameras 102*a*-102*n* resulted in a false positive and generate a response that provides feedback to the smart cameras 102*a*-102*n* to help prevent future false positives. In yet another example, if the neural network AI modules 122 does detect an object, the distributed servers 104*a*-104*n* may generate a response that instructs the smart cameras 102*a*-102*n* to upload the video data that corresponds to time of the detected object to the storage servers 108*a*-108*n*. In still another example, if the neural network AI modules 122 does detect an object, the distributed servers 104*a*-104*n* may generate a response that notifies the smart cameras 102*a*-102*n* that the object was detected and the smart cameras 102*a*-102*n* may send a real-time notification to the user device 106 with information about the detected object. The response of the distributed servers 104*a*-104*n* and/or the smart cameras 102*a*-102*n* to the detected object may be varied according to the design criteria of a particular implementation.

The smart cameras 102*a*-102*n* uploading the still images that correspond to the detected triggering event may restrain bandwidth (e.g., an amount of data transferred) and compute requirements for the distributed servers 104*a*-104*n*. For example, by restraining the amount of video data sent to the distributed servers 104*a*-104*n* to only the still images may reduce the compute resources used by the system 100 compared to constantly uploading and processing all of the captured video data (e.g., a full video stream) on the distributed servers 104*a*-104*n*. Using the still images may reduce the compute resources used while still enabling the full server neural network AI models implemented by the distributed servers 104*a*-104*n* to perform the object detection as well as send real-time notifications. For example, using the still images may reduce resources without sacrificing the accuracy of the object detection in the system 100.

Various types of input detected by the smart cameras 102*a*-102*n* may be determined to be one of the triggering events. For example, the triggering events may be any type of event determined to be relevant (e.g., motion detected, a button pressed, a time schedule, data from an external sensor, etc.). The smart cameras 102*a*-102*n* may be configured to only upload the still images to the distributed servers 104*a*-104*n* when the triggering event is detected. For example, the system 100 may combine multiple modalities of detection on the smart cameras 102*a*-102*n* (e.g., using a combination of any, some, or all of vision, passive IR motion, sound, touch sensors, etc. to decide when to trigger) to restrain the amount of data sent to the distributed servers 102*a*-102*n*. Sending sequences of still images to the distributed servers 104*a*-104*n* instead of full video may reduce the data uploaded (e.g., use less bandwidth), decrease latency and/or use fewer computational resources.

The smart cameras 102*a*-102*n* may not necessarily implement the simplified neural network AI modules 118. One, or more, or none of the smart cameras 102*a*-102*n* may implement the simplified neural network AI modules 118. Generally, the smart cameras 102*a*-102*n* may be less capable of detecting objects (e.g., relatively dumb) compared to the distributed servers 104*a*-104*n*. However, the smart cameras 102*a*-102*n* may be capable (e.g., smart enough) to filter down the set of events for the distributed servers 104*a*-104*n* to process.

The smart cameras 102*a*-102*n* may be configured to upload data (e.g., the captured video data, still images, audio, etc.) to the distributed servers 104*a*-104*n* and/or the storage servers 108*a*-108*n*. For example, the data uploaded to the storage servers 108*a*-108*n* may be streamed to the user device 106. The user device 106 may connect to the storage servers 108*a*-108*n* to allow the user to request the stored video data. For example, the video data may be sent to the user device 106 as a live (or nearly live) video stream. The data traffic to/from the smart cameras 102a-102n, the distributed servers 104a-104n, the user device 106 and/or the storage servers 108a-108n may be encrypted (e.g., AES 128-bit encryption, AES 256-bit encryption, etc.). User account passwords may be salted and hashed with a cryptographic hash function.

The functionality of the system 100 may be configured to leverage the hardware of the smart cameras 102a-102n and the processing capabilities of the distributed servers 104a-104n. For example, the hardware of the smart cameras 102a-102n may be capable of implementing the functionality for detecting the triggering event (e.g., detecting motion, recording video data, analyzing audio, etc.). In some embodiments, the system 100 may be enabled by performing a firmware update of the smart cameras 102a-102n. The firmware update may provide updated computer readable instructions for the processor 114 to enable selecting images from the video data and communicating the selected images to the distributed servers 104a-104n (e.g., instead of uploading the full video stream).

Figure 2:
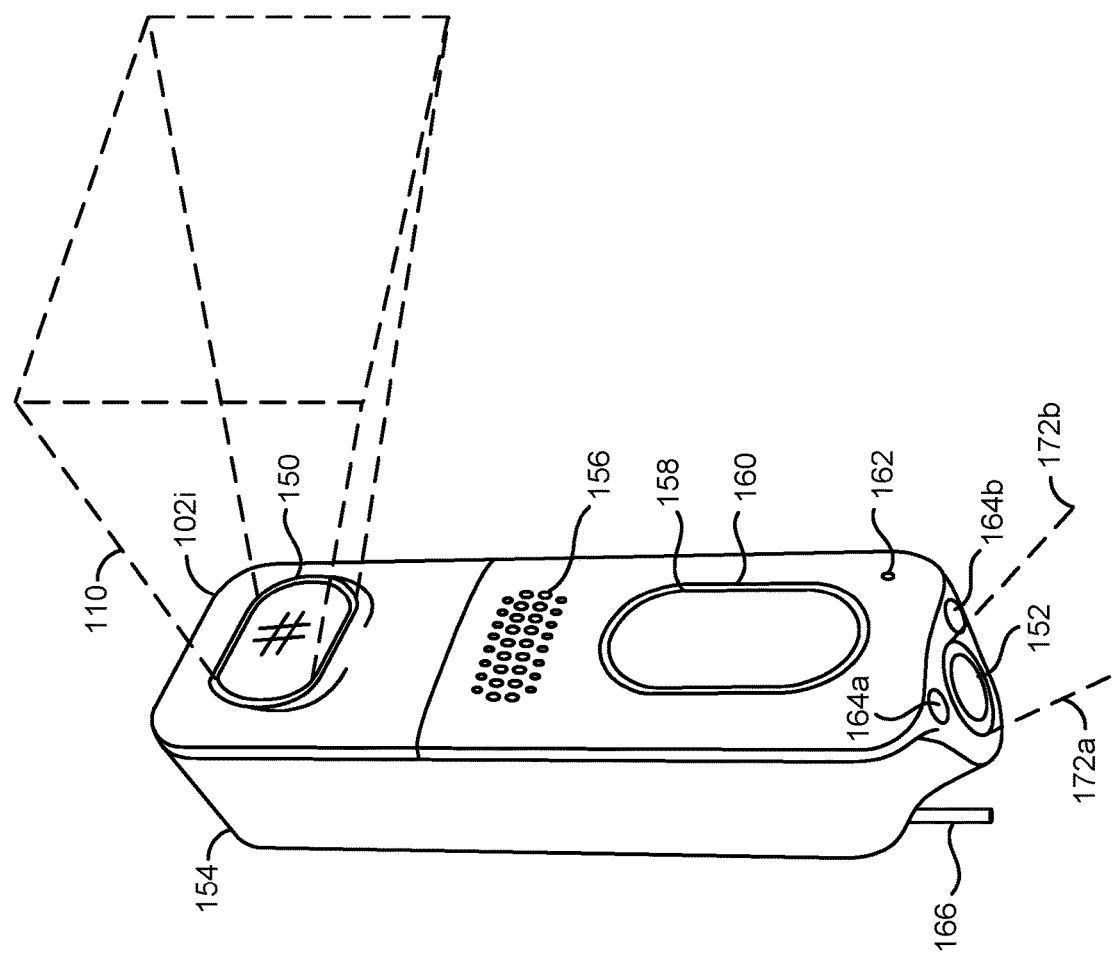
FIG. 2 is a diagram illustrating an example embodiment of a smart camera.

Referring to FIG. 2, a diagram illustrating an example embodiment of an outdoor smart camera is shown. The smart camera 102i may be a representative example of the smart cameras 102a-102n. The smart camera 102i may be a multi-functional device that comprises at least a video/image recording function and/or an audio recording/playback function. The smart camera 102i may be configured as an outdoor wireless hub. In the example shown, the smart camera 102i may be a smart security doorbell camera (e.g., configured to generate video recordings of visitors approaching and/or entering a premises). In another example, the smart camera 102i may be implemented as a smart security light. In some embodiments, the smart camera 102i may be implemented as an outdoor security device (e.g., a doorbell security camera mounted to the outside of the home). In some embodiments, the smart camera 102i may be implemented as an indoor security device. The implementation and/or the functionality of the smart camera 102i may be varied according to the design criteria of a particular implementation.

In the example shown, the smart camera 102i may comprise various components. The smart camera 102i is shown comprising a component 150, a component 152, a component 154, a component 156, a component 158, a component 160, a component 162, components 164a-164b and/or a component 166. The components 150-166 may enable the various functionality and/or features for the smart camera 102i. In the example shown, the component 150 may be a lens, the component 152 may implement a lens, the component 154 may be a housing, the component 156 may implement a microphone/speaker grille, the component 158 may implement a button (e.g., a doorbell), the component 160 may implement accent lights, the component 162 may implement a status light, the components 164a-164n may implement lights (e.g., for illumination and/or infrared lighting) and/or the component 166 may implement a power cable. In one example, the speaker grille 156 may facilitate an audio playback feature by allowing sound waves generated by a speaker component (e.g., the audio output device) within the housing 154 to easily pass through the housing 154 (e.g., provide good sound quality). In another example, the button 158 may enable a doorbell feature by providing a contact that activates the doorbell. The number, type, design, layout and/or functionality of the components 150-166 may be varied according to the design criteria of a particular implementation.

The camera lens 150 is shown having an oblong shape. For example, the oblong shape of the component 150 may have a larger width dimension than height dimension. The lens 150 may be configured to accept light for a capture device (e.g., a camera sensor). The lens 150 may be configured to provide protection for an internal component of the smart camera 102i (e.g., the capture device). In an example, the lens 150 may be a wide-angle lens. An image sensor (described in association with FIG. 4) may be located behind the lens 150.

The field of view 110 is shown extending from the lens 150. The field of view 110 may represent a capture area for the capture device located behind the lens 150. In the example shown, the field of view 110 may be a truncated rectangular pyramid. The shape of the field of view 110 may generally match the shape of the lens 150 (e.g., the width of the field of view 110 may be greater than the height of the field of view 110). Similarly, dotted lines 172a-172b are shown extending from the lens 152. The dotted lines 172a-172b may represent a capture area (e.g., field of view) for a capture device located behind the lens 152. In the example shown, the lens 152 may have a circular shape. In the example shown, the smart camera 102i may implement a dual-camera security device configured to capture two separate capture areas (e.g., provide two different views).

The smart camera 102i may comprise the housing 154. The housing 154 may be configured to encase various components of the smart camera 102i (e.g., electronics configured to implement and/or facilitate the implementation of features). The housing 154 may be molded together and/or snapped together to form a single enclosure. In some embodiments, the housing 154 may be non-removable. The housing 154 may comprise various openings to enable and/or facilitate functionality of the smart camera 102i (e.g., openings for speakers, microphones, cables, camera lenses, etc.). In one example, the housing 154 may be a plastic material. In another example, the housing 154 may be a weatherproofed material configured to operate in outdoor conditions (e.g., rain, snow, heat, etc.).

The speaker grille 156 may enable audio to be emitted by an internal speaker of the smart camera 102i. The speaker grille 156 may enable audio to be received by an internal microphone. The speaker and microphone may enable the smart camera 102i to implement a two-way audio communication (e.g., an intercom). In an example, the internal microphone detecting audio may be a triggering event.

The button 158 may enable a visitor to interact with the smart camera 102i. In an example, the button 158 may activate an audio alert within a premises (e.g., a doorbell). The button 158 may also activate and/or enable other functionality of the smart device 102i (e.g., the intercom feature, a visitor identification feature, a configuration feature, etc.). In an example, pressing the button 158 may be a triggering event.

The accent lights 160 may surround and/or be located next to the button 158. The accent lights 160 may provide soft lighting to highlight the location the button 158. The accent lights 160 may provide a small amount of illumination to direct the attention of a visitor to the button 158. A color of the accent lights 160 may be customized by the homeowner.

The status light 162 may indicate an operational mode of the smart camera 102i. In one example, the status light 162 may be off when the video data is not being recorded (e.g., no visitors or objects are detected and the video data is captured and analyzed, but not stored long term). In another example, the status light 162 may be orange to indicate that the smart camera 102*i* is in an armed state (e.g., a package has been detected and the smart camera 102*i* is on high alert for potential package thefts). The status light 162 may indicate whether a triggering event has been detected. The color of the status light 162 and/or the various operating modes of the smart camera 102*i* may be varied according to the design criteria of a particular implementation.

The apparatus 100 may further comprise lights 164*a*-164*b*. In some embodiments, the lights 164*a*-164*b* may be implemented to illuminate an area. For example, illumination using the lights 164*a*-164*b* may improve video data captured in dark environments (e.g., which may assist with detecting objects when analyzing the video data). In some embodiments, the lights 164*a*-164*b* may implement IR scanners. The IR scanners implemented using the lights 164*a*-164*b* may be configured to detect and/or scan various codes (e.g., bar codes, tracking numbers, QR codes, etc.). For example, if a package is left under the smart camera 102*i*, the lights 164*a*-164*b* may scan the tracking number and provide a notification to a user via a companion application usable on the computing device 106. The IR scanner 164*a*-164*b* may be configured to implement a PIR sensor. In an example, tripping the PIR sensors 164*a*-164*b* may be a triggering event.

Figure 3:
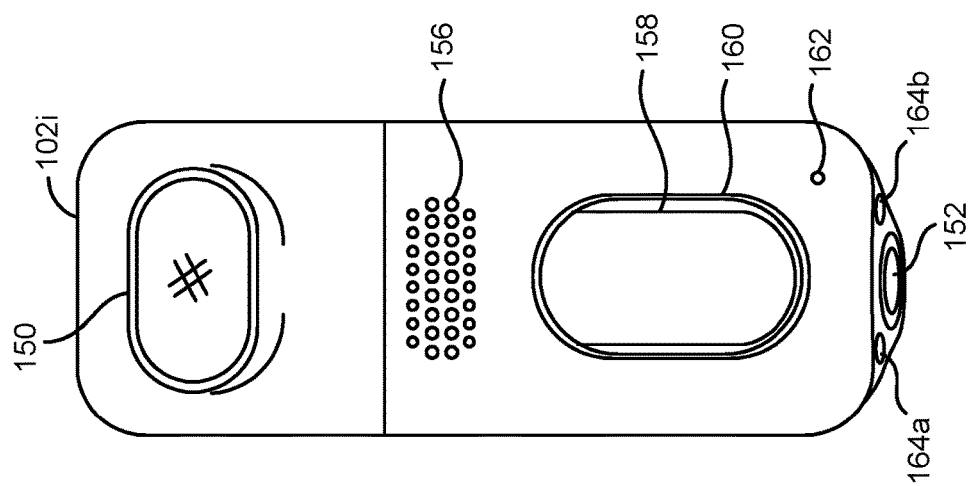
FIG. 3 is a diagram illustrating a front view of an example embodiment of a smart camera.

Referring to FIG. 3, a diagram illustrating an alternate view of the outdoor smart camera 102*i* is shown. A front view of the smart camera 102*i* is shown. The front view of the smart camera 102*i* may show the lens 150, the lens 152, the microphone/speaker grille 156, the button 158, the accent lights 160, the status light 162 and/or the lights 164*a*-164*b*.

The lens 150 may be horizontally centered on the smart camera 102*i*. In some embodiments, the lens 150 may be implemented having a tilt. The tilt of the lens 150 may be configured to accommodate an angle of the image sensor of the capture device within the smart camera 102*i*. In one example, the lens 150 may have a 5 degree tilt (e.g., upwards) to capture a view with a different capture area than the capture area of the lens 152 (e.g., so that video data captured may provide a view of faces of visitors). For example, the smart camera 102*i* may enable capturing a head-to-toe image of a person using a combination of the view captured using the lens 150 and the lens 152.

The smart camera 102*i* may be implemented having a thin profile. For example, the smart camera 102*i* may be relatively tall compared to the width. The thin profile of the smart camera 102*i* may impose size and/or space restrictions for the components 150-166 and/or the lens 150. One example of the functionality of the smart camera 102*i* may be implemented by the capture device located behind the lens 150. For example, the capture device may be a wide angle camera.

The lens 150 may have a relatively small height compared to width (e.g., an oblong shape). The oblong shape of the lens 150 may reduce a size footprint of the lens 150 on the front face of the smart camera 102*i*. A small height for the lens 150 may enable more components (e.g., which allows for greater functionality) to fit on the front face of the smart camera 102*i*. If the lens 150 had a larger height, the larger height may occupy more space that could be used for other components.

In the example shown, the shape of the lens 150 may have rounded corners. In some embodiments, the shape of the lens 150 may have edged corners (e.g., rectangular corners that meet at a 90 degree angle). In some embodiments, the shape of the lens 150 may have a combination of rounded and edged corners. The shape of the corners may be cosmetic. The lens 150 may have a width dimension greater than a height dimension.

A capture device may be present behind the lens 150 and the lens 152. Each of the capture devices may generate video frames. The smart camera 102*i* may generate a video stream in response to the video frames captured by the capture device associated with the lens 150. The smart camera 102*i* may generate a video stream in response to the video frames captured by the capture device associated with the lens 152. In one example, the video processor 114 may be configured to perform video operations on the video frames to generate video data (e.g., the video stream). The video operations performed by the processor 114 may be varied according to the design criteria of a particular implementation.

In some embodiments, the button 158 on the smart camera 102*i* may comprise a fingerprint detector. A fingerprint of a visitor may be captured by the fingerprint detector (or scanner) when the visitor presses the button 158 to activate the doorbell chime. The fingerprint scanner may be used to detect a triggering event.

Figure 4:
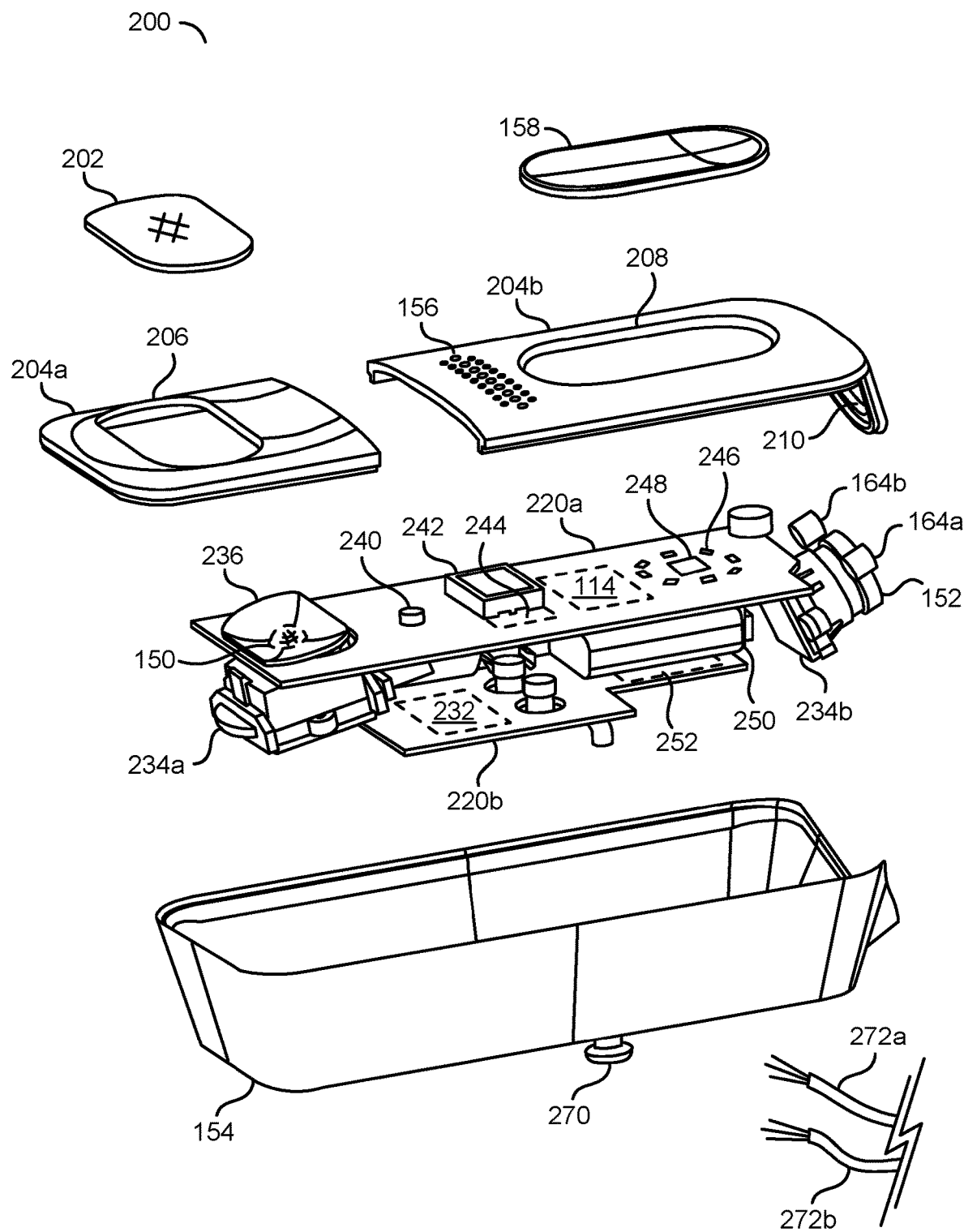
FIG. 4 is a diagram illustrating an exploded view of a smart camera.

Referring to FIG. 4, a diagram illustrating an exploded view 200 of the outdoor smart camera 102*i* is shown. The exploded view 200 may illustrate various components internal to the smart camera 102*i*. The internal components of the smart camera 102*i* may provide the various functionality and/or implement various features of the smart camera 102*i*. In an example, the internal components of the smart camera 102*i* shown, may correspond with the components 112*a*-112*n* and/or the processor 114 shown in association with FIG. 1.

An object 202 is shown. The object 202 may be a protective cover for the lens 150. The cover 202 may be implemented as a clear material (e.g., to provide protection while still allowing light to reach the image sensor). In one example, the clear material of the cover 202 may be implemented as a piece of glass. In another example, the cover 202 may be implemented as a piece of clear plastic. The cover 202 may not provide a removable, opaque shutter. The implementation of the cover 202 may be varied according to the design criteria of a particular implementation.

The housing 154 is shown. In the example shown, the housing 154 is hollow. The hollow housing 154 may be configured to provide a protective enclosure for the components of the smart camera 102*i*. The enclosure 154 is shown separated. An upper faceplate 204*a* and a lower faceplate 204*b* are shown. The upper faceplate 204*a* and the lower faceplate 204*b* may provide a front face of the housing 154. Together, the upper faceplate 204*a*, the lower faceplate 204*b* and the housing 154 may provide the protective and/or decorative enclosure for the internal components of the smart camera 102*i*. The upper faceplate 204*a* and/or the lower faceplate 204*b* may implement a body plate for the smart camera 102*i*. The upper faceplate 204*a* and/or the lower faceplate 204*b* may provide a front cover for the housing 154. In the exploded view 200, the upper faceplate 204*a*, the lower faceplate 204*b* and the housing 154 are shown as separated (e.g., for illustrative purposes). However, the upper faceplate 204*a*, the lower faceplate 204*b* and the housing 154 may form a single enclosure for the smart camera 102*i*. In some embodiments, the upper faceplate 204*a*, the lower faceplate 204*b* and the housing 154 may snap together. In some embodiments, the upper faceplate 204*a*, the lower faceplate 204*b* and the housing 154 may be molded together, fused together and/or permanently adhered together. In one example, the upper faceplate 204*a* may be non-removable.

The upper faceplate 204a may comprise a lens opening 206. The cover 202 may have a size and shape that matches the size and shape of the lens opening 206 (e.g., a width may be greater than the height). The lower faceplate 204b may comprise the speaker/microphone grille 156, an opening 208 and an opening 210. The lens opening 206 may be implemented as an integrated portion of the upper faceplate 204a. For example, the lens opening 206 may not be removed from the upper faceplate 204a. The speaker/microphone grille 156, the opening 208 and/or the opening 210 may be implemented as an integrated portion of the lower faceplate 204b. Generally, the lens opening 206 may not be removable from the upper faceplate 204a and/or the housing 154.

The opening 208 may provide a space for the button 158 to fit into the opening 208 and let through the ambient light 160. For example, when the button 158 is pressed, the opening 208 may allow the button 158 to move into the housing 154 to make contact with a component of the smart camera 102i. The opening 210 may provide a space for the lights 164a-164b and/or the lens 152.

Various components of the smart camera 102i are shown in the exploded view 200. Circuits 220a-220b are shown. The circuits 220a-220b may provide interconnections and/or mounting locations for the various components of the smart camera 102i. The various components of the smart camera 102i may fit within a limited amount of vertical space of the housing 154.

The circuits 220a-220b may comprise the processor 114, a block (or circuit) 232, blocks (or circuits) 234a-234b, a lens housing 236, a block (or circuit) 240, a block (or circuit) 242, a block (or circuit) 244, a block (or circuit) 246, a block (or circuit) 248, a block (or circuit) 250 and/or a block (or circuit) 252. The circuit 232 may implement a wireless communication device. The circuits 234a-234b may implement image sensors. The circuit 240 may implement a microphone (e.g., an audio capture device). The circuit 242 may implement a speaker (e.g., an audio output device). The circuit 244 may implement an audio processor. The circuit 246 may implement lights (e.g., LEDs). The circuit 248 may implement a fingerprint scanner. The circuit 250 may implement a power storage/power conversion (e.g., a battery, an AC power converter, voltage regulation, etc.). The circuit 252 may implement storage (e.g., memory). The circuits 220a-220b may comprise other components (not shown). The components may be implemented on either of the circuits 220a-220b (e.g., based on physical space constraints, heating constraints, operating condition constraints, etc.). The number, type, and/or arrangement of the components of the circuits 220a-220b may be varied according to the design criteria of a particular implementation.

The size of the opening 206 may affect the number of the components of the circuits 220a-220b that may be implemented by the smart camera 102i. For example, the hollow housing 154 may have a limited amount of space. To provide functionality, the components may need to fit within the constraints of the hollow housing 154. If the size of the opening 206 takes up too much space, one or more of the components may be unable to fit within the constraints of the hollow housing 154.

The communication module 232 may receive and/or transmit data signals. The communication module 232 may register electromagnetic signals, acoustic signals, and/or other signals. The communication module 232 may provide control signals (e.g., to turn on a light bulb, create sound from one or more speakers, send alerts to users, send other wireless signals, etc.).

The communication module 232 may be configured to connect to a local network and/or a wide area network (e.g., the internet 50). In some embodiments, the communication module 232 may be configured to implement one or more types of communications protocols. For example, the communication module 232 may support a Wi-Fi connection and/or a Bluetooth connection. In some embodiments, the communication module 232 may be distributed as multiple circuits (e.g., a processing chip for each communications protocol). Other types of communications protocols may be implemented according to the design criteria of a particular implementation. In some embodiments, the communication module 232 may implement the Bluetooth connection to connect to the user device 106 (e.g., a smartphone) to provide an interface for configuring the smart cameras 102a-102n (e.g., to allow the user to input local network settings).

In some embodiments, the communication module 232 may implement the Wi-Fi connection to connect to a cloud service via the internet 50. The communication module 232 may enable a stream of video data and/or images generated by the processor 114 to the cloud service. In one example, the communication module 232 may find an available server and upload the video data and/or images to the available server. In another example, the communication module 232 may implement an upload queue and the available server may pull the data from the upload queue.

The image sensors 234a-234b may implement video capture devices. In an example, the image sensors 234a-234b may be rectangular with a 16:9 aspect ratio. The image sensor 234a-234b may receive light within the truncated rectangular pyramid field of view 110 and/or 172a-172b. The image sensors 234a-234b may be configured to convert received light into computer readable data (e.g., pixels that comprise video frames). The image sensors 234a-234b may be implemented to record video data. The lens 150 may correspond with the image sensor 234a. The lens 150 may be configured to focus incoming light onto the image sensor 234a. The lens 150 may be a wide-angle lens. In an example, the lens 150, the image sensor 234a and/or other circuits may implement a capture device. The lens 152 may correspond to the image sensor 234b. The processor 114 may be configured to generate video frames in response to captured pixels transmitted from the image sensors 234a-234b.

The image sensors 234a-234b may enable the capture of video data using the processor 114. For example, the processor 114 may be configured to capture 720p HD (or 1080p or higher) video data from the pixel data captured by the image sensors 234a-234b. In some embodiments, the image sensors 234a-234b may each capture video data at different resolutions. The video data may be high-resolution video frames and/or audio data. The quality of the video data may be varied according to the design criteria of a particular implementation. Generally, the quality (e.g., resolution, level of detail, color, etc.) of the video data is enough to support object detection (e.g., facial recognition, motion detection, object identification, tagging, etc.).

The processor 114 may be configured to perform various video operations. The video processor 114 may generate video data (e.g., one or more video streams) in response to the pixel data from the sensors 234a-234b. The video processor 114 may be configured to encode and/or decode video data into various formats (e.g., video formats and/or still image formats). The video processor 114 may be configured to compress and/or stream video data. The video processor 114 may be configured to re-size images and/or video frames for a fixed resolution (e.g., a fixed resolution used by a neural network).

In some embodiments, the video processor 114 may implement the neural network 118. The neural network 118 may be configured to analyze the video data in real time. The video analysis performed by the neural network 118 may detect, recognize and/or classify objects. For example, the objects may comprise people (e.g., a visitor), animals, inanimate objects (e.g., a delivered package), etc. The video analysis may be configured to learn patterns, recognize objects and/or recognize faces. The processor 114 may be configured to de-warp the video captured (e.g., correct distortions caused by the lenses 150-152). The processor 114 may be configured to combine multiple fields of view into one image.

The lens housing 236 may be a housing for the front wide angle lens 150. The cover 202 may fit over top of the lens housing 236 and the lens 150 may be behind the cover 202. The lens housing 236 may isolate the wide angle lens 150 from other components of the smart camera 102i.

The microphone component 240 may receive audio signals. Audio signals detected by the microphone 240 may be used by the processor 114 to generate various control signals (e.g., a triggering event). In one example, audio signals generated by the visitor may be received by the microphone 240 to generate a control signal used to control a light bulb, and/or control a door (e.g., opening, closing, and/or locking a door). Audio signals detected by the microphone 240 may be used as an audio password. For example, voice recognition may be used to generate a password. The audio password may be needed to allow the smart camera 102i to generate various control signals. In one example, the microphone component 240 may capture the audio input and present the audio input to the communication device 232 for streaming to the user device 106. In another example, the microphone 240 may capture the audio input and present the audio input to the audio processing component 244 for encoding (e.g., to be stored by the storage component 252).

The speaker 242 may generate audio signals. The speaker 242 may be implemented as one or more speakers. In one embodiment, the speaker 242 may be configured to generate a moderate volume sound (e.g., 75 dB at a range of 1 meter). However, the particular volume generated may be varied to meet the design criteria of a particular implementation.

The audio processing component 244 may be configured to encode, decode and/or play back audio. In an example, the audio processing component 244 may be configured to play back pre-recorded audio stored in the storage component 252 (e.g., pre-recorded greetings, alarms, music, etc.). In another example, the audio processing component 244 may be configured to play back audio received from the user device 106 in real-time.

In some embodiments, the audio processing component 244 may be configured to stream audio signals from the mobile device 106, and/or other devices within range of the smart cameras 102a-102n. The communication module 232 (e.g., a Wi-Fi antenna) may be configured to communicate with the mobile device 106, and/or other devices to send and/or receive audio signals. In some embodiments, the communication module 232 may comprise a connection port that may be configured to communicate with various devices to send and/or receive audio signals (e.g., via USB). The audio signals may be stored in the memory 252. In one example, the speaker 242 may generate audio signals to attract outdoor wildlife and/or chase away undesired wildlife. The smart cameras 102a-102n may capture images of the wildlife. Images may be stored in the memory 252. An alert may be sent to the user via the companion application.

The LEDs 246 are shown in a circular arrangement. The LEDs 246 may generate the small amount of ambient light 160. The ambient light 160 generated by the LEDs 246 may highlight the location of the button 158. The LEDs 246 may be configured to emit various colors and/or provide various lighting patterns (e.g., a soft pulsing, always on, turn on when motion is detected by the processor 114, etc.).

The fingerprint scanner 248 may be configured to analyze a fingerprint of a person that presses the button 158. The fingerprint scanner 248 may provide pre-screening and/or identification of the visitor. For example, known visitors (e.g., friends, family, repeated guests, etc.) may be identified based on the fingerprint of the visitor. The companion application operating on the user device 106 may enable customized responses based on visitor profiles. The visitor profile may comprise the fingerprint to associate the detected visitor with the visitor profile. In some embodiments, the fingerprint scans used to associate the fingerprint detected by the fingerprint scanner 248 may be stored on the smart camera 102i (e.g., by the memory 252). In some embodiments, the fingerprints detected by the fingerprint scanner 248 may be communicated wirelessly to a remote device (e.g., a cloud computing service such as the distributed servers 104a-104n, a database such as the storage server 108a-108n, a computer such as the user device 106, etc.) to determine the identity of the visitor and provide the information in the visitor profile.

When the visitor is detected using the fingerprint scanner 248 (or using other detection methods such as video analysis to perform facial recognition), one type of notification may be presented to the user device 106 if the visitor is identified within the visitor profile database. In some embodiments, emergency services may provide databases of known criminals and/or other people of interest (e.g., missing persons, suspects, etc.).

In some embodiments, the button 158 may comprise the fingerprint scanner 248. In some embodiments, the fingerprint scanner 248 may be used by the smart camera 102i to control a door lock and/or doorbell. For example, the fingerprint scanner 248 may detect the fingerprint of the finger pressing the button 158 and store the fingerprint (e.g., in the memory 252 and/or the cloud database). The smart camera 102i (or the cloud service 104a-104n using cloud processing) may be configured to review and/or categorize the fingerprint of each person detected for future detection of the same fingerprint.

The power adapter 250 may receive electrical power from the premises. Electrical power from the premises may be presented to the circuits 120a-120b. The power adapter 250 may convert the electrical power (e.g., from AC to DC). The converted electrical power may provide a power supply to the various components attached to the circuit boards 120a-120b. The power adapter 250 may perform voltage regulation. In one example, the power adapter 250 may be implemented as a 5V power adapter.

In one example, the power storage component 250 may be a battery (e.g., rechargeable) configured to supply power to the circuits 120a-120b (e.g., the smart camera 102i may comprise a solar panel for capturing energy to recharge the battery). In another example, the power storage and/or adapter component 250 may be configured to convert an AC power supply to DC power usable by the components of the circuits 120a-120b.

The memory 252 may store computer readable data (e.g., images, audio, video, sensor readings and/or other data). In one example, the storage component 252 may be a non-volatile storage medium. In another example, the storage component 252 may be a combination of non-volatile and volatile memory. Data stored in the memory 252 may be compared to various signals from sensor modules implemented by the circuits 220a-220b. In one example, the data stored in the memory 252 may be a password. The processor 114 may compare the password with signals from the sensor modules. The comparison may determine whether a triggering event has occurred. The storage component 252 may store audio data (e.g., the pre-recorded audio for playback, the received audio), video data (e.g., the video streams, still images), computer readable instructions and/or other data.

The circuits 220a-220b may comprise various sensor modules (e.g., environmental sensors). In an example, the circuits 220a-220b may comprise an electromagnetic field sensor, an acoustic field sensor, a voice recognition sensor, a facial recognition sensor, a gesture sensor, a weather sensor and/or other sensors (e.g., a PIR motion detector to detect people and/or animals). One or more of the sensor modules, or a combination of the sensors modules, may be implemented internally (e.g., within the housing 132) or, alternatively, may be implemented externally (e.g., as a separate sensing device coupled to the apparatus 100). Input received by the sensor modules may be used to generate control signals and/or detect triggering events In some embodiments, the apparatus 100 may store the captured video data (e.g., in the memory 252). In some embodiments, the video data may be uploaded to the storage servers 108a-108n. Generally, the storage servers 108a-108n and/or the memory 252 may have a limited storage capacity. In some embodiments, the smart cameras 102i may analyze the captured video data (e.g., using the processor 114) and/or data from the IR sensor to perform a particular type of detection (e.g., a triggering event). For example, the smart camera 102i may detect objects, motion and/or visitors within 3 meters (e.g., 10 feet). Still images generated from the captured video frames may be uploaded to the distributed servers 104a-104n. The neural network 122 implemented by the distributed servers 104a-104n may determine whether objects are present in the images uploaded. Based on the feedback from the distributed servers 104a-104n, the apparatus 100 may initiate storage of the video data in the storage servers 108a-108n in response to the particular type of detection.

The processor 114 may implement machine learning techniques to improve detection accuracy of visitors and/or objects. For example, the user may be able to provide a correct and/or incorrect label to a detection performed by the processor 114. If the detection is incorrect, the incorrect label may be used by the smart camera 102i to incorporate an incorrect result of the detection into the machine learning techniques. In some embodiments, the machine learning techniques may be implemented in the cloud service (e.g., the analysis is performed using cloud computing resources) based on feedback about whether objects of interest were actually present. Video data and/or correct/incorrect labels may be uploaded and/or stored anonymously (e.g., without personal identification information). The smart cameras 102a-102n may be configured to ignore (e.g., not respond to, not track and/or not send notifications in response to) small animals and/or shadows.

A connector 270 is shown attached to the housing 154. Power cable(s) 272a-272b may provide power via the connector 270. In an example, the power cables 272a-272b may provide a connection to a household power supply. The connector 270 may connect to the power storage/power conversion device 250 to provide an external power supply. In some embodiments, the power connector 270 may be a USB power connection. In the example shown, the connector 270 may be a T-Terminal (e.g., with the wires 270a-270b as a source power supply for the premises) connection. In an example, for a doorbell style security smart camera 102i, the T-Terminal connection may be implemented (e.g., most doorbells use a T-Terminal connection).

The circuits 220a-220b and/or the components 114, 232-252 may be entirely and/or partially enclosed within the housing 154 (and the upper faceplate 204a and the lower faceplate 204b). The components may provide the functionality of the smart camera 102i. In some embodiments, the components may implement the functionality for a smart security camera. In one example, the speaker 242 and the audio processing device 244 may be configured to generate audio for communicating to a visitor and the microphone 240 may be configured to receive audio (e.g., to enable 2-way communication). In another example, the fingerprint scanner 248 may be configured to identify a visitor that presses the button 158 based on a fingerprint. Details of the functionality of the circuits 220a-220b and/or the various components 114 and 232-252 may be described in U.S. patent application Ser. No. 16/143,853, filed on Sep. 27, 2018, appropriate portion of which are hereby incorporated by reference in their entirety.

Figure 5:
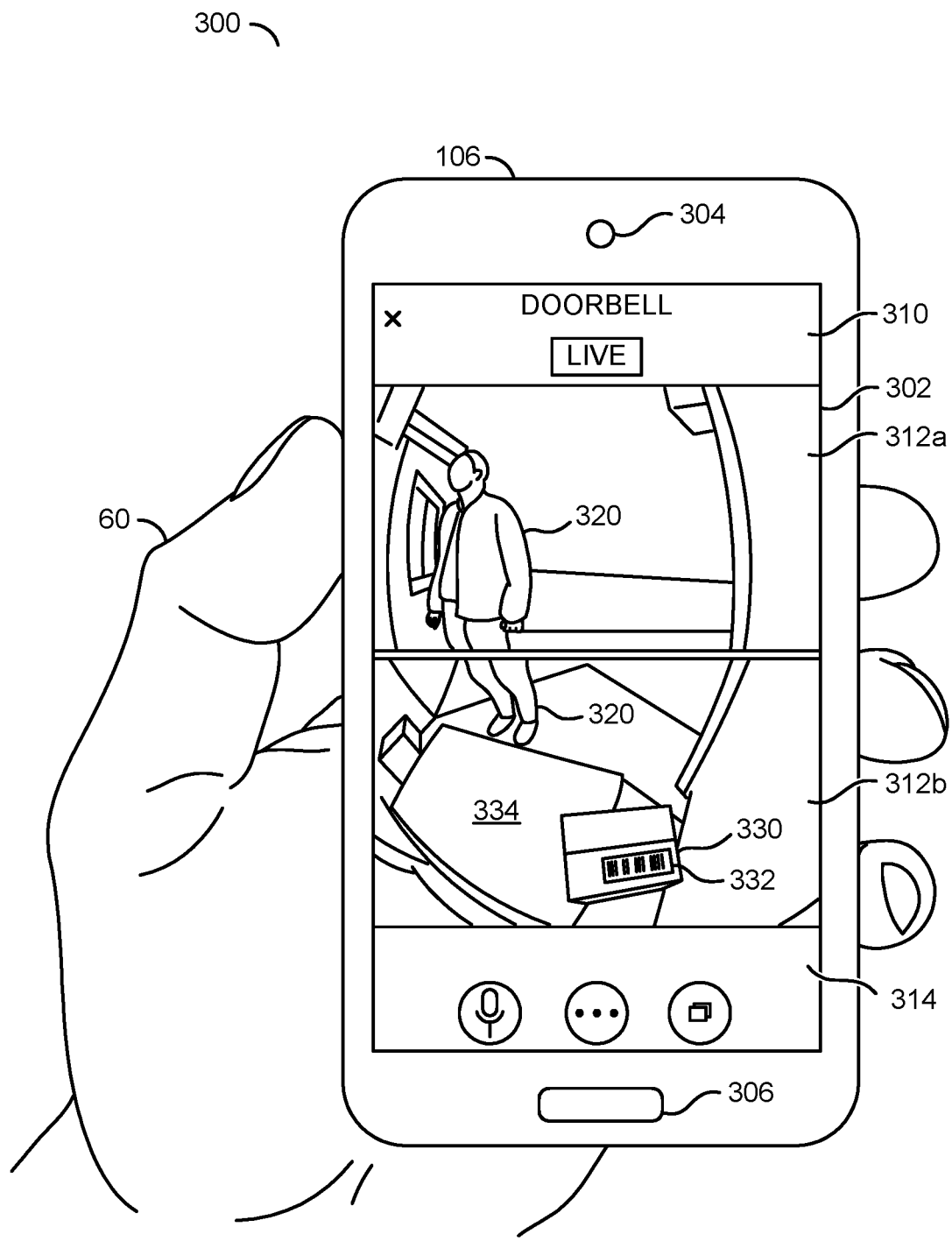
FIG. 5 is a diagram illustrating a dual view video capture displayed on a user device.

Referring to FIG. 5, a diagram illustrating a dual view video capture displayed on a user device is shown. An example context 300 of the invention is shown. In the example context 300, the user device 106 is shown held by a user 60 (e.g., a homeowner). For example, the user device 106 may be a portable (e.g., handheld) device (e.g., the user device 106 shown in association with FIG. 1). In the example shown, the user device 106 may be a smartphone.

The smartphone 106 is shown having a display 302, a speaker 304 and a microphone 306. In an example, the display 302 may be a touchscreen display enabling the user 60 to view output from the smartphone 106 and/or provide input (e.g., touch controls) to the smartphone 106. The speaker 304 may playback audio. The microphone 306 may receive audio. In an example, the speaker 304 and the microphone 306 may enable the user 50 to interact with the smart cameras 102a-102n as a two-way intercom. In one example, the speaker 304 on the smartphone 106 may playback audio captured by the microphone component 224 and wirelessly transmitted by the smart camera 102i. In another example, the microphone 306 on the smartphone 106 may capture audio that may be wirelessly transmitted to the smart camera 102i and the smart camera 102i may playback the audio (e.g., using the speaker component 242).

The display 302 is shown displaying a companion application 310. The smart cameras 102a-102n may be compatible with the companion application 310. For example, the companion application 310 may be a smartphone app (e.g., iOS app, an Android app). In some embodiments, the companion application 310 may be a computer program (e.g., for Windows, macOS, Linux, etc.). The companion application 310 may enable the user 60 to remotely interact with the features of the smart cameras 102a-102n. For example, the companion application 310 may be configured to interface with the smartphone microphone 306 and speaker 304 to enable the user 60 to use the smart camera 102i as an intercom (e.g., audio received by the smartphone 106 may be played by the speaker 242 of the smart camera 102i and audio received by the microphone 440 of the smart camera 102i may be played back to the user by the smartphone speaker 304).

In the example shown, the companion application 310 shown on the smartphone 106 may display a video stream 312a and a video stream 312b. The video stream 312a may correspond with the video stream generated by the image sensor 234a. The video stream 312b may correspond with the video stream generated by the image sensor 234b. For example, the smart camera 102i may be configured to wirelessly communicate (e.g., a live stream and/or a recorded file for later playback) the video streams to the smartphone 106 using the communication device 232. The companion application 310 may playback the video streams 312a-312b.

In the example shown, the companion application 310 may further comprise controls 314. The controls 314 may enable access to various features of the companion application 310. In one example, the controls 314 may be a play/pause video progress bar (e.g., used to control what portion of the video streams 312a-312b the user 60 is viewing). In another example, the controls 314 may be a live view indicator (e.g., to indicate whether the video streams 312a-312b are live video currently captured by the device 102 or a pre-recorded file). In yet another example, the controls 314 may be a toggle button to toggle between options (e.g., enable/disable a live view). In another example, the controls 314 may be a button configured to activate/deactivate audio communication (e.g., one-way audio by the user 60 to be played back by the smart camera 102i and/or a two-way intercom to additionally receive audio from the smart camera 102i). In still another example, the controls 314 may be a button to access other features of the smartphone 106 (e.g., an app-drawer). In another example, the controls 314 may be a button configured to control a light that may be coupled with the smart cameras 102a-102n. The features and/or controls 314 implemented by the companion application 310 may be varied according to the design criteria of a particular implementation.

In the example shown, the companion application 310 operating on the smartphone 106 may show a dual view displaying both video streams 312a-312b. In some embodiments, the companion application 310 may display one of the video streams 312a-312b at a time or neither of the video streams 312a-312b. The dual view may comprise the front view video stream 312a corresponding to the field of view 110 captured by the front facing lens 150. The dual view may comprise the bottom view video stream 312b corresponding to the field of view 172a-172b captured by the bottom lens 152.

The video streams 312a-312b shown may be captured by the image sensors 234a-234b from the doorbell embodiment of the smart camera 102i. In the example shown, the video stream 312a may comprise a view captured by the front-facing capture device 234a. For example, in a doorbell embodiment, the smart camera 102i may be mounted to a surface at approximately 48 inches from the ground (e.g., a standard doorbell height). The video stream 312a may capture a view of a visitor 320 from the height of a doorbell. In the example shown, the field of view 110 for the video stream 312a may capture a waist, torso, chest and face of the visitor 320.

For the doorbell embodiment of the smart camera 102i, the video stream 312b may comprise a view captured by the bottom capture device 234b. The bottom capture device 234b may capture an area below the smart camera 102i. In the example shown, the video stream 312b may comprise a high angle view of the bottom (e.g., from the waist down) of the visitor 320. The video stream 312b may further comprise a view of a package 330. For example, the field of view 172a-172b for the bottom view video stream 312b may be oriented to capture packages 330 left at the premises. A tracking number 332 is shown on the package 330. A portion of a welcome mat 334 is also visible in the example shown.

The video processor 114 may be configured to scan the tracking number 332. For example, the image quality of the capture device 234b may be high enough to enable the video processor 114 to read various tracking numbers (e.g., bar codes, numbers, QR codes, etc.). The video processor 114 may read and/or decipher the tracking number 332 using optical character recognition and/or object detection. In some embodiments, the wireless communication device 232 may be configured to send a notification using the companion application 310 to indicate that the package 330 with the tracking number 332 read by the video processor 114 has been delivered. In some embodiments, the user 60 may use the companion application 310 to input and store particular tracking numbers of expected packages, and the video processor 114 may compare the detected tracking number 332 against the stored tracking numbers. In an example, detecting the package 330 may be a triggering event.

In an example, the video streams 312a-312b may be played back simultaneously. For example, the front view video stream 312a may show a view of the face of a visitor 320 and the bottom view 312b may show the waist down view of the visitor 320 and the package 330 at the same time. For example, if the visitor 320 is a burglar stealing the package 330, the front view video 312a may provide a clear view of the face (e.g., identity) of the visitor 320 but not the package 330 and the bottom view video 312b may show the visitor 320 stealing the package 330 but not provide a view of the face to identify the thief. Similarly, if the visitor 320 is attempting to break into the home by opening the door, the front view video 312a may not provide the view of the door but the bottom view video 312b may show the visitor 320 attempting to open the door. The videos 312a-312b captured by both the front capture device 234a and the bottom capture device 234b may be used as evidence for police of the visitor 320 trying to steal the package 330 and/or attempting to break into the premises.

In some embodiments, the device 102 may be configured to send notifications to the companion application 310 in response to the detection and/or authentication. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user 60 may create a user account (e.g., comprising at least an email address and a password as credentials) for the cloud service 104a-104n (e.g., via an app and/or a web-based interface). The user account may allow the user 60 to configure preferences. The preferences may comprise the notification settings. The type of notifications sent by the smart cameras 102a-102n may be based on the notification settings. In an example, the notification may provide an indication of when the package 330 has been delivered.

The video output streams 312a-312n may be configured to capture the head to toe view of the visitor 320. For example, the FOV 110 and the FOV 172a-172b of the smart cameras 102a-102n may be configured to provide a view of the full height of a person. Since two FOVs are used from two different cameras, the two streams may not provide a continuous view of the person 320, but the view may appear to be somewhat continuous. In some embodiments, video operations may be performed on the video data from the dual camera sensors 234*a*-234*b* to modify (e.g., warp) the images to provide a continuous view of the person 320.

In an example, the top camera sensor 234*a* may provide 1080p HDR video data. The top camera sensor 234*a* may have a 30 ft range with night vision. The bottom camera sensor 234*b* may be configured to prevent blindspots. For example, the bottom camera sensor 234*b* may provide coverage for areas that are not covered by the top camera sensor 234*a* (e.g., to provide a full top to bottom view of a visitor). The bottom camera sensor 234*b* may implement a white LED night vision (e.g., using the lights 164*a*-164*b*). In a doorbell dualcam embodiment, a 110 dB+siren may be implemented and a speaker for playing back the greetings and/or other audio.

In the example shown, the app 310 is used to access the dual video streams 312*a*-312*b*. The app 310 may be further configured to provide a premium plan with artificial intelligence (e.g., package monitoring and theft protection).

The video analysis may be configured to detect special events (e.g., triggering events) such as a package delivery (e.g., at the door). The detection of a package delivery may initiate an alert state to prevent package theft. When the package is detected at the door, the current event may be overridden with the alert state (e.g., the default schedule may be interrupted by the alert state). A special greeting may be enabled during the package alert state.

Figure 6:
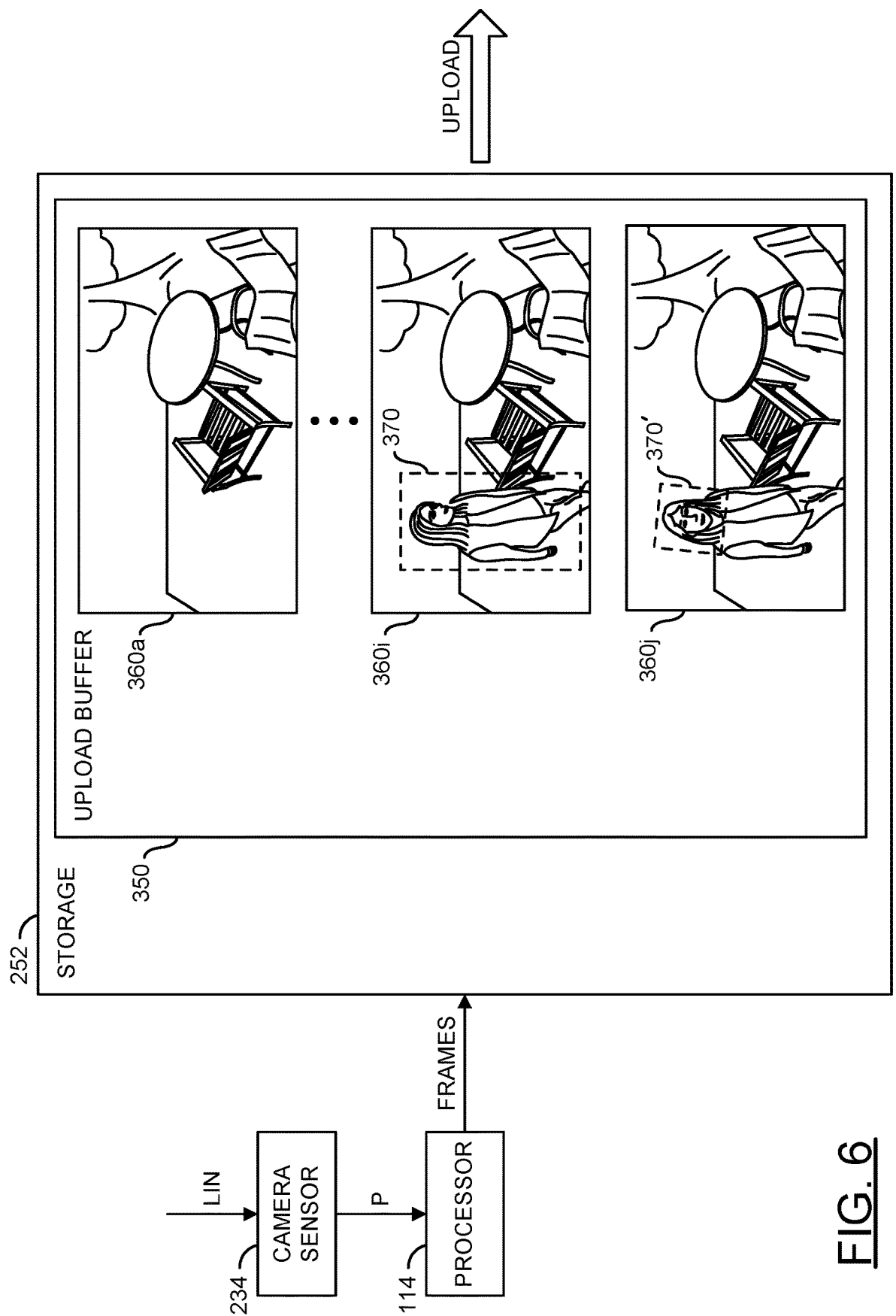
FIG. 6 is a diagram illustrating a video buffer implemented by the smart camera.

Referring to FIG. 6, a diagram illustrating a video buffer implemented by the smart camera is shown. A portion of the components 112*a*-112*n* of the smart cameras 102*a*-102*n* (e.g., the camera sensor 234, the processor 114 and the storage 252) are shown. The camera sensor 234 may correspond to one of the sensors 234*a*-234*b* shown in association with FIG. 4.

The camera sensor 234 may capture an input signal (e.g., LIN). The signal LIN may be light input captured (e.g., in the field of view 110). The camera sensor 234 may convert the light input LIN into pixel data. The camera sensor 234 is shown generating a signal (e.g., P). The signal P may be pixel data transmitted to the processor 114. The processor 114 may be configured to generate video frames in response to the pixel data P. The processor 114 is shown generating a signal (e.g., FRAMES). The signal FRAMES may be the video frames generated by the processor 114. The video frames FRAMES may be stored in the storage component 252.

The storage component 252 may comprise a block (or circuit or module) 350. The module 350 may be an upload buffer (e.g., a frame buffer and/or a memory buffer). The storage component 252 may comprise other components (not shown). The number, type and/or arrangement of the components of the storage 252 may be varied according to the design criteria of a particular implementation.

The upload buffer 350 is shown comprising a number of video frames 360*a*-360*j*. The video frames 360*a*-360*j* may be a sequence of video frames in the signal FRAMES that may be stored temporarily by the upload buffer 350. The video frames 360*a*-360*j* may be a subset of the video frames in the signal FRAMES generated by the processor 114. The upload buffer 350 may have a limited capacity (e.g., may only store video frames that correspond to a pre-determined length of time). In an example, the upload buffer 350 may have a capacity that enables approximately 2 minutes of video data to be stored.

The upload buffer 350 may be configured to temporarily store the video frames in the signal FRAMES. The upload buffer 350 may enable the smart cameras 102*a*-102*n* to implement a local loop (e.g., to always be recording and over-write old video data as new video data is recorded). The video frames 360*a*-360*j* in the upload buffer 350 may be over-written as new video frames in the signal FRAMES are presented. In an example, the upload buffer 350 may store the video frames 360*a*-360*j* in a first in first out implementation. For example, the upload buffer 350 may be a ring buffer. Each of the video frames 360*a*-360*j* may be time-stamped. For example, the video frame 360*a* may have the earliest timestamp and the video frame 360*j* may have the most recent timestamp.

The video frames 360*a*-360*j* stored in the upload buffer 350 may be uploaded to an external resource. In some embodiments, the video frames 360*a*-360*j* may be uploaded to the storage servers 108*a*-108*n*. For example, all or some of the video frames 360*a*-360*j* may be uploaded to the storage servers 108*a*-108*n* to store a video clip that is approximately 2 minutes long (e.g., the end-user may stream the video clip stored in the storage servers 108*a*-108*n* to the user device 106). In some embodiments, all or some of the video frames 360*a*-360*j* may be uploaded to the distributed servers 104*a*-104*n*.

In the example shown, the video frames 360*a*-360*h* may not comprise an event considered interesting (e.g., no movement, a still scene, no animals, no people, etc.). In the example shown, the video frame 360*i* may comprise an event 370. The event 370 may be a triggering event (e.g., movement, an animal detected, a person detected, etc.). In some embodiments, the triggering event 370 may not be something visible in the video frames (e.g., an audio detection, pressing the button 158, etc.). In some embodiments, the triggering event 370 may be a pre-determined amount of time. In the example shown, the event 370 may be a person. In the example shown, the video frame 360*j* may comprise the event 370'. For example, the event 370' may be a continuation of the triggering event 370 from the previous video frame 360*i*. In the example shown, the video frames 360*a*-360*j* may be analyzed by the processor 114 and the first (e.g., earlier) number of video frames 360*a*-360*h* may have a result of no event detected and the video frames 360*i*-360*j* may have a result of an event being detected.

When the triggering event 370 is detected, the processor 114 may select some of the sequence of video frames 360*a*-360*j* from the upload buffer 350 to upload to the distributed servers 104*a*-104*n* for additional analysis by the neural network artificial intelligence module 122. For example, the smart cameras 102*a*-102*n* may be configured to always be recording but not always uploading data to the distributed servers 104*a*-104*n* and/or the storage servers 108*a*-108*n*. The sequence of images and/or video frames 360*a*-360*j* may be stored in the upload buffer 350 so that when the triggering event 370 is detected, the smart camera (s) 102*a*-102*n* may be capable of providing still image samples of the field of view 110 (or the field of view 172*a*-172*b*) to the distributed servers 104*a*-104*n* from before the triggering event 370, after the triggering event 370 and/or during the triggering event 370. For example, after the triggering event 370, the smart camera(s) 102*a*-102*n* may be able to continually upload the still images as the processor 114 generates new video frames.

Implementing the upload buffer 350 to enable uploading some of the video frames 360*a*-360*j* from before and after the triggering event 370 is detected may ensure that enough information is sent to the distributed servers 104*a*-104*n* to use for detection, context and/or classification. Furthermore, providing the still images selected from the video frames 360*a*-360*j* from before and after the triggering event 370 may ensure that data from before the triggering event 370 may be provided to the user 60 on the user device 106. Providing the still images selected from the video frames 360a-360j from before and after the triggering event 370 may eliminates an issue of the distributed servers 104a-104n receiving video uploads that are only triggered upon detecting motion that are delayed (e.g., due to inherent delays of starting a video upload), which results in the upload starting too late to capture the desired subject (e.g., the triggering event 370 is missed because the subject of the triggering event 370 has already left the field of view 110 by the time the video stream starts the upload).

Implementing the upload buffer 350 may enable the system 100 to overcome major limitations of sending up data to the distributed servers 104a-104n. One major limitation overcome by using the upload buffer 350 may be that providing some of the video frames 360a-360j that are timestamped from before the triggering event 370 may enable the neural network artificial intelligence module 122 to "look back in time" to analyze the event. For example, by looking at the video frames 360a-360j that have a timestamp from before the triggering event 370, the neural network AI module 122 may have an opportunity to analyze a person that is moving quickly that could be out of the field of view 110 and/or the field of view 172a-172b by the time the video stream started uploading data (e.g., the person is out of view). Selecting a sample of the video frames 360a-360j (e.g., more than one) may ensure that the triggering event 370 is not missed entirely.

Figure 7:
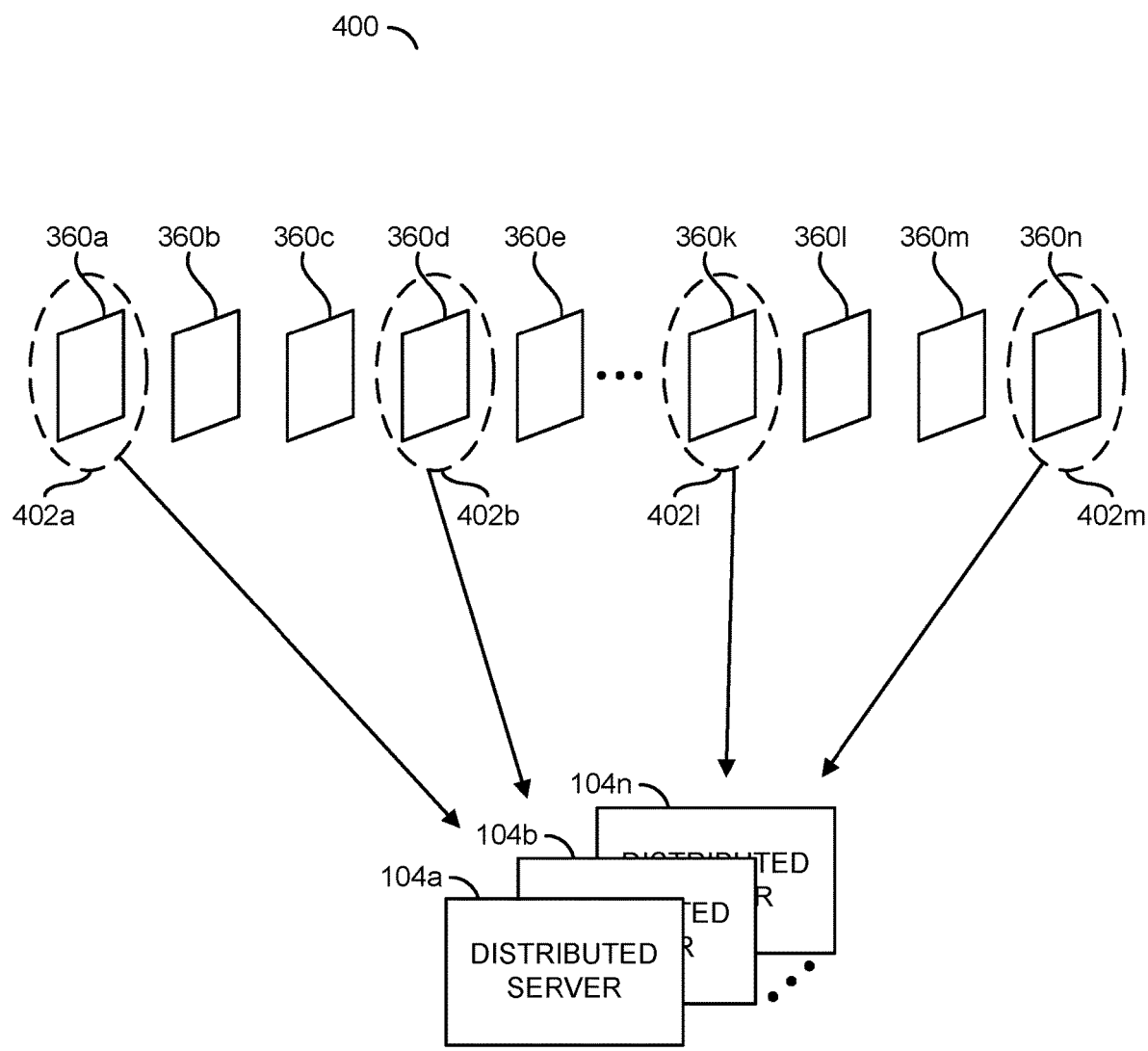
FIG. 7 is a diagram illustrating selecting images to upload to distributed servers.

Referring to FIG. 7, a diagram illustrating selecting images to upload to distributed servers is shown. An illustrative representation 400 is shown. The illustrative representation 400 may comprise the distributed servers 104a-104n and a sequence of the video frames 360a-360n. The sequence of the video frames 360a-360n may correspond to the signal FRAMES shown in association with FIG. 6. In an example, the sequence of video frames 360a-360n may be video data passing through the upload buffer 350.

In response to the processor 114 determining that the triggering event 370 has occurred, the processor 114 may select a sampling of the video frames 360a-360n. The selected sample of the video frames 360a-360n may be the still images. For example, the still images uploaded to the distributed servers 104a-104n may be a visual component of the individual video frames (e.g., no audio).

Selected video frames 402a-402m are shown. The selected video frames 402a-402m may be the still images. The still images 402a-402n are shown uploaded to the distributed servers 104a-104n. The distributed servers 104a-104n may use the neural network AI modules 122 to perform the advanced image analysis (e.g., object detection, object classification, facial recognition, computer vision, etc.) on the selected images 402a-402m.

In the example shown, the selected image 402a may correspond to the video frame 360a, the selected image 402b may correspond to the video frame 360d, the selected image 402l may correspond to the video frame 360k and the selected image 402m may correspond to the video frame 360n. Which of the video frames 360a-360n are selected for the selected images 402a-402m may be varied according to the design criteria of a particular implementation.

Generally, there may be fewer selected images 402a-402m than the video frames 360a-360n generated by the processor 114. Uploading the fewer selected images 402a-402m may ensure that less data is uploaded (e.g., less bandwidth is used) to and/or processed by the distributed servers 104a-104n than the full set of video frames 360a-360n. The selected images 402a-402m may be a subset of the video frames 360a-360n.

The rate for selecting the selected images 402a-402m may be much less than the frame rate for generating the video frames 360a-360n. For example, the processor 114 may generate video at 15 fps, 30 fps, 60 fps, etc. The selected images 402a-402m may correspond to a rate that is less than the normal video frame rate (e.g., less than 15 fps, 30 fps 60 fps, etc.). In one example, the selected images 402a-402m may be selected at a rate of one frame every one second (e.g., 1 fps).

In some embodiments, the selected images 402a-402m may be selected at a constant rate (e.g., periodically) from the video frames 360a-360n. For example, every 60th one of the video frames 360a-360n may be selected. In another example, the frame rate for selecting the selected images 402a-402m may be less than one frame per second or more than one frame per second (e.g., 5 fps).

In some embodiments, the selected images 402a-402m may be selected at a varying rate. For example, selected images 402a-402m may be selected at a slower rate for the video frames 360a-360n that were captured before the triggering event 370 (e.g., at 1 fps). Then the selected images 402a-402m may be selected at a higher rate for the video frames 360a-360n that were captured shortly after the triggering event 370 was detected (e.g., at a rate of 10 fps for the seconds after the triggering event 370). Then the rate of selecting the selected images 402a-402m may be reduced again (e.g., selected at a rate of 5 fps for the next minute and a half after the initial 30 seconds from the triggering event 370).

In some embodiments, the selected images 402a-402m may be selected intelligently by the processor 114. In one example, the processor 114 may perform an analysis on potential candidates for the selected images 402a-402m. For example, if every 60th video frame is to be uploaded, then the processor 114 may analyze every 60th video frame to determine a quality of the video frame. If the next potential candidate is determined to be of low quality (e.g., too blurry, out of focus, corrupted image, etc.) then another video frame that is temporally close (e.g., the 61st video frame instead of the unsuitable 60th video frame) may be selected as an alternate selected image (e.g., to ensure that the selected images 402a-402n have sufficient visual quality for successful object detection).

In some embodiments, the intelligent selection of the selected images 402a-402m may be determined by the processor 114 by performing a motion and/or object detection. For example, the processor 114 may monitor the video frames 360a-360n for motion and select the selected images 402a-402m as the video frames 360a-360n that contain the most motion. In another example, the simplified neural network 118 may be implemented to perform an initial object detection and the video frames 360a-360n that are determined to have objects of interest may be selected as the selected images 402a-402m.

The intelligent selection of the selected images 402a-402m by the processor 114 may provide the distributed servers 104a-104n images that have a higher probability of providing information that may be used to confirm whether the triggering event 370 has occurred. In one example, intelligently selecting the selected images 402a-402m based on which of the video frames 360a-360n have motion detected may have a higher probability of confirming the triggering event 370 than selecting the selected images 402a-402n at random. The method and/or rate of selected the selected images 402a-402m from the video frames 360a-360n may be varied according to the design criteria of a particular implementation.

The selected images 402a-402m may comprise video frames that have a timestamp from before the triggering event 370 and/or after the triggering event 370. In the example shown, if the triggering event 370 corresponds to the video frame 360d, then the selected image 402a may be the video frame 360a that is timestamped before the triggering event 370 and the selected images 402l may be the video frame 360k timestamped after the triggering event 370. By storing the video frames 360a-360n in the ring buffer 350, the smart cameras 102a-102n may send images from slightly before the triggering event 370 as well as afterward for the same triggering event 370.

By sending the selected images 402a-402m instead of a full video stream, the smart cameras 102a-102n may use less bandwidth to upload to the distributed servers 104a-104n. Sending less data may result in a faster response time by the distributed servers 104a-104n. Since there is less data to analyze than with a full video, the distributed servers 104a-104n may generate an output faster (e.g., in real time). Furthermore, the selected still images 402a-402m may be analyzed (e.g., processed) in parallel across the distributed servers 104a-104n, which may also result in faster output compared to analyzing an entire video clip. By uploading a subset of data (e.g., the selected images 402a-402m) instead of the full video (e.g., the video frames 306a-306n), the amount of data uploaded may be restrained. By restraining the amount of data processed by distributed servers 104a-104n, the costs for utilizing the compute resources of the distributed servers 104a-104n may be constrained.

Figure 8:
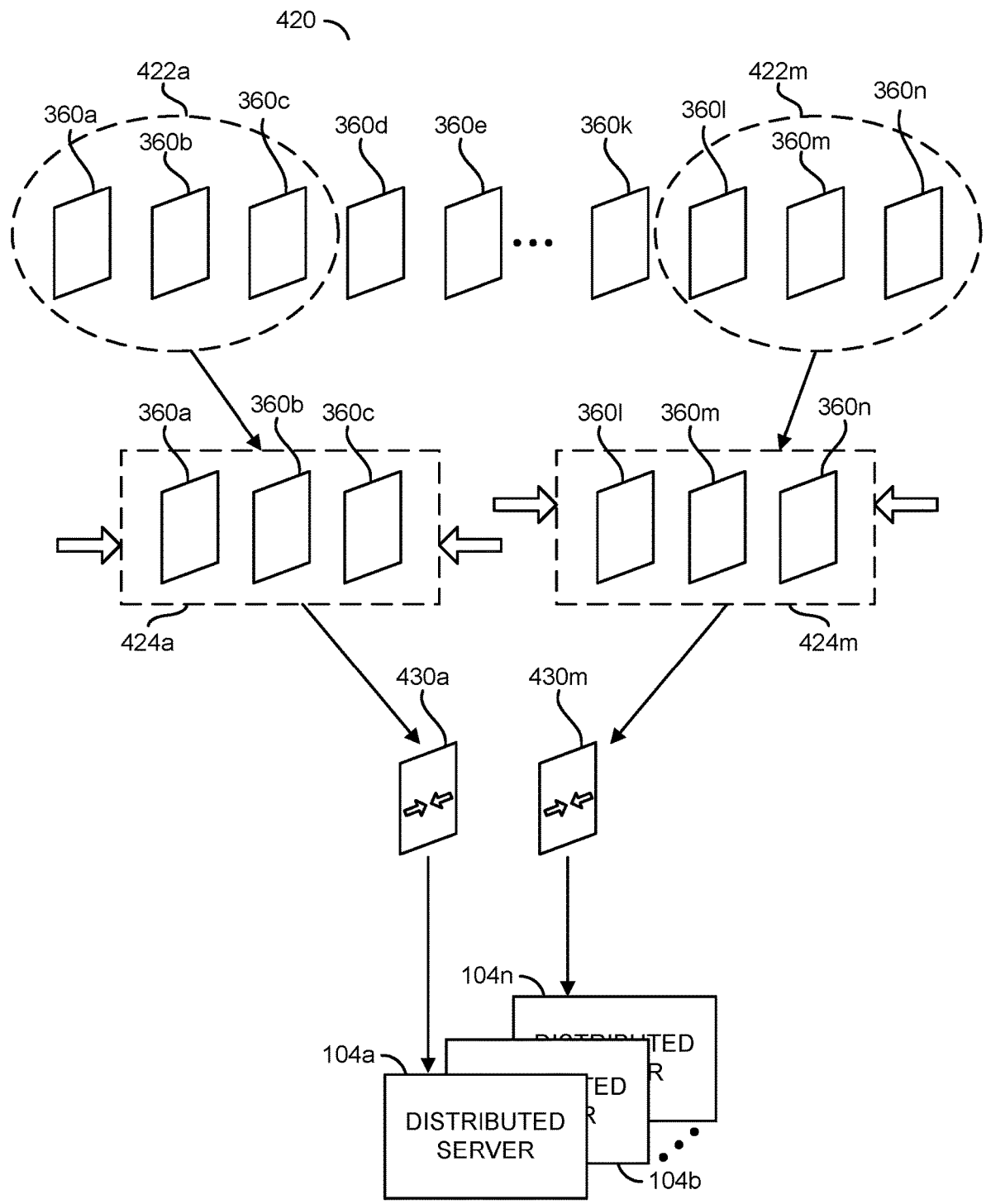
FIG. 8 is a diagram illustrating selecting images and using inter-frame compression to upload to distributed servers.

Referring to FIG. 8, a diagram illustrating selecting images and using inter-frame compression to upload to distributed servers is shown. An illustrative representation 420 is shown. The illustrative representation 420 may comprise the distributed servers 104a-104n and a sequence of the video frames 360a-360n. The sequence of the video frames 360a-360n may correspond to the signal FRAMES shown in association with FIG. 6. In an example, the sequence of video frames 360a-360n may be video data passing through the upload buffer 350.

In some embodiments, the processor 114 may be configured to perform inter-frame compression between the video frames 360a-360n. The inter-frame compression may further restrain the amount of data uploaded. For example, using inter-frame compression may enable the smart cameras 102a-102n to upload more information (e.g., video data corresponding to more of the video frames 360a-360n than with uploading the selected images 402a-402m) while using less data than uploading the entire video frame sequence 360a-360n. In some embodiments, the processor 114 may be configured to send the difference from the previous image(s) to generate compressed images. Other more sophisticated inter-frame compression methods may be implemented. The type of inter-frame compression performed by the processor 114 may be varied according to the design criteria of a particular implementation.

Groups of video frames 422a-422m may be selected from the video frames 360a-360n by the processor 114. The groups of video frames 422a-422m may be a subset of the video frames 360a-360n. For example, there may be fewer groups of video frames 422a-422m than there are total number of video frames 360a-360n.

In the example shown, the groups of video frames 422a-422m may each comprise 3 of the video frames 360a-360n. In the example shown, the group of video frames 422a may comprise the video frames 360a-360c and the group of video frames 422m may comprise the video frames 360l-360n. In some embodiments, the number of video frames 360a-360n in each of the groups 422a-422m may be different (e.g., the group of video frames 422a may comprise 2 video frames and the group of video frames 422m may comprise 4 video frames). In some embodiments, the number of video frames 360a-360n in each of the groups 422a-422m may be the same (e.g., each group of video frames 422a-422m may comprise 5 of the video frames 360a-360n). The number of the video frames 360a-360n selected for each of the groups of video frames 422a-422m may be varied according to the design criteria of a particular implementation.

Dotted boxes 424a-424m are shown. The dotted boxes 424a-424m may represent compression operations performed by the processor 114. The compression operations 424a-424m may be performed on each of the groups of video frames 422a-422m. In the example shown, the compression operation 424a may be performed on the group of video frames 422a (e.g., the video frames 360a-360c) and the compression operation 424m may be performed on the group of video frames 422m (e.g., the video frames 360l-360n).

The compression operations 424a-424m may be configured to compress the video frames in the group of video frames 422a-422m to generate compressed video frames 430a-430m. The compressed video frames 430a-430m may be used as the selected still images. The compressed video frames 430a-430m may be uploaded by the smart cameras 102a-102n to the distributed servers 104a-104n. The distributed servers 104a-104n may be configured to perform decompression operations on the compressed video frames 430a-430m to extract the full video frames for performing the computer vision operations by the neural network AI modules 122. In an example, the distributed servers 104a-104n may perform the decompression operations on the compressed video frame 430a to recreate the video frames 360a-360c. In some embodiments, the neural network AI modules 122 may be configured to perform the computer vision operations on the compressed video frames 430a-430m (e.g., without first performing a decompression operation).

The compressed video frames 430a-430m may be generated to comprise data corresponding to each of the source video frames from the corresponding groups of video frames 422a-422m. For example, the compressed video frame 430a may comprise video data (or image data) from the video frames 360a-360c and the compressed video frame 430m may comprise video data (or image data) from the video frames 360l-360m. The compression operations 424a-424m may be configured to generate the compressed video frames 430a-430m having a smaller amount of data (e.g., smaller file size) than the total file size of the video frames 360a-360n in the source group of video frames 422a-422m. In an example, the file size of the compressed video frame 430a may be smaller than the size of all three of the video frames 360a-360c. In an example, if each of the video frames 360a-360c in the group of video frames 422a is 5 MB then the group of video frames 422a may have a file size of 15 MB (e.g., 5 Mb+5 MB+5 MB) and the compressed video frame 430a may have a smaller file size (e.g., 8 MB).

Uploading the compressed video frames 430a-430m may enable the distributed servers 104a-104n to have additional information (e.g., compared to uploading the selected images 402a-402m) for performing the object detection and/or classification. For example, the compressed video frames 430a-430m may comprise image data from more of the video frames 360a-360n than the selected images 402a-402n, which may enable more accurate detection by the neural network AI modules 122. In some embodiments, between each of the groups of video frames 422a-422m, each of the video frames 360a-360n may be represented by the output compressed video frames 430a-430m. The compressed video frames 430a-430m may still restrain the amount of data uploaded to and/or processed by the distributed servers 104a-104n. The compressed video frames 430a-430m may also be discrete files that may be uploaded in parallel across the distributed servers 104a-104n. The compressed video frames 430a-430m may result in an upload of more data and/or more processing resources used by the distributed servers 104a-104n (e.g., additional decompression operations may use more resources) than the selected images 402a-402n. The amount of data uploaded and processed for the compressed video frames 430a-430m may be less than uploading and processing the full sequence of video frames 360a-360n.

Figure 9:
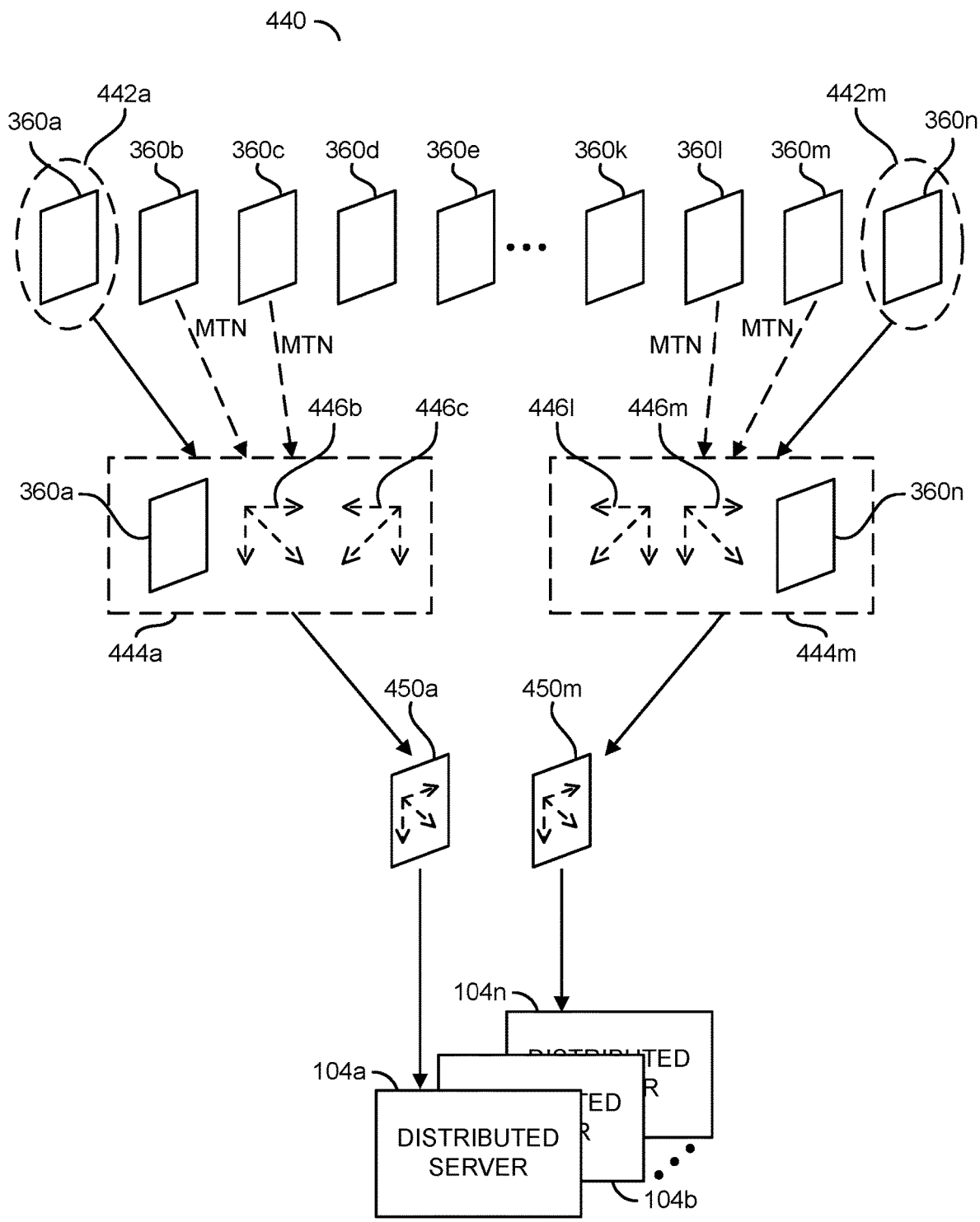
FIG. 9 is a diagram illustrating selecting images and using motion patterns to upload to distributed servers.

Referring to FIG. 9, a diagram illustrating selecting images and using motion patterns to upload to distributed servers is shown. An illustrative representation 440 is shown. The illustrative representation 440 may comprise the distributed servers 104a-104n and a sequence of the video frames 360a-360n. The sequence of the video frames 360a-360n may correspond to the signal FRAMES shown in association with FIG. 6. In an example, the sequence of video frames 360a-360n may be video data passing through the upload buffer 350.

In some embodiments, the processor 114 may be configured to create composite images with motion patterns (e.g., based on a visual motion detection operation) and/or other data overlaid on the normal visual image. In some embodiments, the processor 114 may be configure to create composite images of several images over time (e.g., similar to a time-lapse photo). Composition images may enable the smart cameras 102a-102n to upload individual still images comprising motion information and/or temporal data that may be used to provide more data (e.g., improve performance) to the neural network AI modules 122.

The processor 114 may be configured to select reference frames 442a-442m from the video frames 360a-360n. The reference frames 442a-442m may be a subset of the video frames 360a-360n. For example, there may be fewer reference frames 442a-442m than there are total number of video frames 360a-360n. The processor 114 may also select a number of the video frames 360a-360n adjacent to the reference frames 442a-442m to extract motion information (e.g., MTN). For example, one of the video operations performed by the processor 114 may be to perform motion estimation between two or more temporally related video frames to generate the motion information MTN.

In the example shown, the reference frames 442a-442m may each comprise 2 adjacent video frames from the video frames 360a-360n. In the example shown, the reference frames 442a may be the video frames 360a and the adjacent frames 360b-360c may provide the motion information MTN and the reference frame 442m may be the video frame 360n and the adjacent frames 360l-360m may provide the motion information MTN. In some embodiments, the number of adjacent video frames for each reference frame 442a-442m may be different (e.g., the processor 114 may extract the motion information MTN from 4 adjacent video frames with respect to the reference frame 442a and extract the motion information MTN from 3 adjacent video frames with respect to the reference frame 442m). In some embodiments, the number of video frames 360a-360n selected to provide the motion information adjacent to each of the reference frames 442a-442m may be the same (e.g., each reference frame 442a-442m may correspond with the motion information MTN from 5 of the video frames 360a-360n). The number of the video frames 360a-360n selected for extracting motion information from for each of the reference frames 442a-442m may be varied according to the design criteria of a particular implementation.

Dotted boxes 444a-444m are shown. The dotted boxes 444a-444m may represent composition operations performed by the processor 114. The composition operations 444a-444m may be performed on each of the reference frames 442a-442m with the corresponding motion information from the adjacent video frames. In the example shown, the composition operation 444a may comprise the video frame 360a and motion information 446b-446c. The motion information 446b-446c may correspond to the motion information MTN extracted from the video frames 360b-360c. In the example shown, the composition operation 444m may comprise the video frame 360m and the motion information 446l-446m. The motion information 446l-446m may correspond to the motion information MTN extracted from the video frames 360l-360m.

The reference frames 442a-442m may be selected similar to the selected video frames 402a-402m described in association with FIG. 7. For example, the reference frames 442a-442m may be selected at a rate that is less than the frame rate used to generate the video frames 360a-360n (e.g., the reference frames 442a-442m may be selected at a rate of 5 fps while the video frames 360a-360n are generated at a rate of 30 fps). The adjacent video frames may be the video frames 360a-360n that are generated immediately before and/or immediately after the reference frames 442a-442m. In the example shown, the adjacent video frames 360b-360c may be the next two video frames that have been generated after the reference frame 442a. In the example shown, the adjacent video frames 360l-360m may be the two video frames that have been generated before the reference frame 442m. In some embodiments, the adjacent video frames may comprise video frames generated before and after the reference video frame.

The composition operations 444a-444m may be configured to generate composite video frames 450a-450m. The composite video frames 450a-450m may be used (e.g., selected) as the selected still images. The composite video frames 450a-450m may be uploaded by the smart cameras 102a-102n to the distributed servers 104a-104n. The distributed servers 104a-104n may be configured to perform motion estimation operations on the composite video frames 450a-450m to extract the full video frames for performing the computer vision operations by the neural network AI modules 122. In an example, the distributed servers 104a-104n may perform the motion estimate operations on the composite video frame 450a to recreate the video frames 360a-360c. In some embodiments, the neural network AI modules 122 may be configured to perform the computer vision operations on the composite video frames 450a-450m (e.g., without first performing a motion estimation operation).

The composite video frames 450a-450m may be generated to comprise data corresponding to the reference video frames 442a-442m and the adjacent video frames. For example, the composite video frame 450a may comprise video data (or image data) from the video frames 360a (e.g., the reference frame 442a) and the motion information 446b (e.g., from the video frame 360b) and the motion information 446c (e.g., from the video frame 360c). In another example, the composite video frame 450m may comprise video data (or image data) from the video frames 360n (e.g., the reference frame 442m) and the motion information 446l (e.g., from the video frame 360l) and the motion information 446m (e.g., from the video frame 360m). The composite operations 444a-444m may be configured to generate the composite video frames 450a-450m having a smaller amount of data (e.g., smaller file size) than the total file size of the video frames 360a-360n used for each of the composite operations 444a-444m. In an example, the file size of the composite video frame 450a may be smaller than the size of all three of the video frames 360a-360c (e.g., the reference frame 442a and the two adjacent video frames).

Uploading the composite video frames 450a-450m may enable the distributed servers 104a-104n to have additional information (e.g., compared to uploading the selected images 402a-402m) for performing the object detection and/or classification. For example, the composite video frames 450a-450m may comprise image data from more of the video frames 360a-360n than the selected images 402a-402n, which may enable more accurate detection by the neural network AI modules 122. In some embodiments, between the reference frames 442a-442m and the corresponding adjacent frames used for the motion information MTN, each of the video frames 360a-360n may be represented by the output composite video frames 450a-450m. The composite video frames 450a-450m may still retain information about the captured video frames 360a-360n while restraining the amount of data uploaded to and/or processed by the distributed servers 104a-104n. The composite video frames 450a-450m may also be discrete files that may be uploaded in parallel across the distributed servers 104a-104n. The composite video frames 450a-450m may result in an upload of more data and/or more processing resources used by the distributed servers 104a-104n (e.g., additional motion estimation operations may use more resources) than the selected images 402a-402n. The amount of data uploaded and processed for the composite video frames 450a-450m may be less than uploading and processing the full sequence of video frames 360a-360n.

Figure 10:
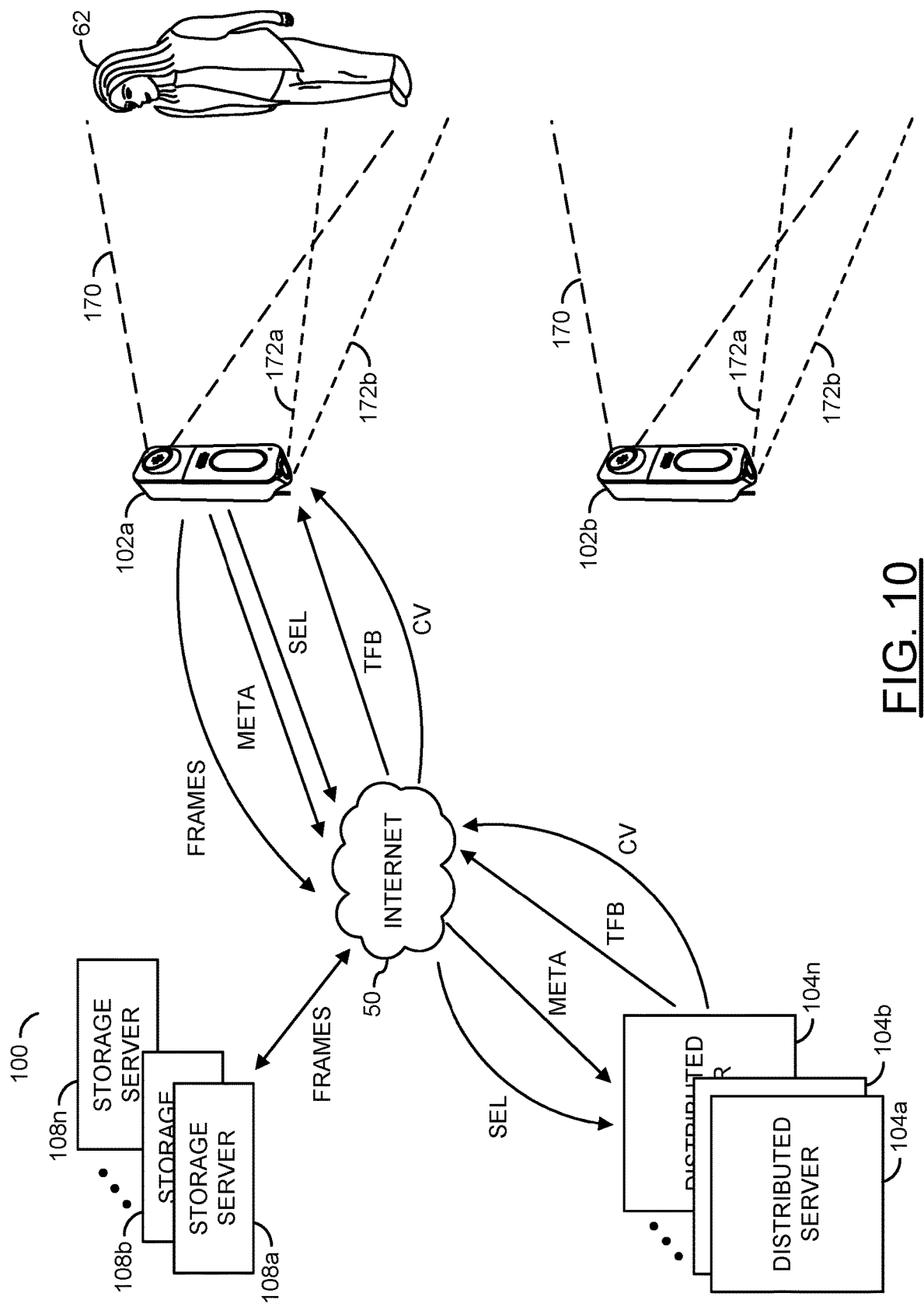
FIG. 10 is a diagram illustrating the system receiving metadata and providing feedback to smart cameras.

Referring to FIG. 10, a diagram illustrating the system 100 receiving metadata and providing feedback to smart cameras is shown. The system 100 is shown with the smart camera 102a capturing video frames of a visitor 62. For example, detection of the visitor 62 may be one example of the triggering event 370. In the example shown, the smart camera 102a may capture the head-to-toe image of the visitor 62 using both the field of view 110 and the field of view 172a-172b. In the example shown, the smart camera 102b may not detect the triggering event 370 and does not upload the captured video frames.

The smart camera 102a is shown uploading to the Internet 50 the signal FRAMES (e.g., the video frames 360a-360n), a signal (e.g., SEL) and/or a signal (e.g., META). The smart camera 102a is shown receiving from the internet 50 a signal (e.g., CV) and a signal (e.g., TFB). The signal FRAMES may be communicated to the storage servers 108a-108n. The signal SEL and the signal META may be communicated to the distributed servers 104a-104n. The signal TFB and the signal CV may be communicated from the distributed servers 104a-104n. Other signals and/or data may be communicated between the smart cameras 102a-102n, the distributed servers 104a-104n and/or the storage servers 108a-108n (not shown). The number of connections and/or type of data communicated may be varied according to the design criteria of a particular implementation.

In response to the triggering event 370, the smart camera 102a may upload the signal SEL. The signal SEL may comprise the selected images. For example, the signal SEL may comprise the selected still image frames 402a-402m, the compressed frames 430a-430m, the composite video frames 450a-450m, etc. The selected images from the signal SEL may be analyzed by the distributed servers 104a-104n.

In response to analyzing the selected images in the signal SEL, the distributed servers 104a-104n may generate the signal CV. The signal CV may comprise the results of the object detection and/or classification performed by the neural network AI module 122. The signal CV may comprise objects, characteristics of the objects, potential responses for the smart camera 102a to perform, etc. In some embodiments, the signal CV may be communicated to the user device 106 (e.g., to be interpreted by the companion app 310).

In response to the signal CV, the smart camera 102a may upload the signal FRAMES. For example, if the distributed servers 104a-104n confirm that the triggering event 370 is an object of interest, the signal CV may provide instructions to store the video frames 360a-360n that correspond to the triggering event 370 long term. The smart camera 102a may upload the signal FRAMES to the storage servers 108a-108n to enable the long term storage. For example, the user 60 may stream the stored video frames from the storage servers 108a-108n on demand using the companion app 310.

The smart camera 102a may be further configured to upload the signal META to the distributed servers 104a-104n. The signal META is shown being communicated to the distributed servers 104a-104n but not to the storage servers 108a-108n. The signal META may comprise configuration settings (e.g., parameters) for the components 112a-112n used to detect the triggering event 370. For example, the signal META may be communicated alongside the selected video frames SEL (e.g., to provide the same configuration settings that were used to trigger the upload of the selected video frames SEL).

The distributed servers 104a-104n may be configured to generate the signal TFB in response to the computer vision performed on the signal SEL and the information in the signal META. For example, the distributed servers 104a-104n may perform an analysis of the metadata based on the results of the object detection. The signal TFB may provide feedback about the detection of the triggering event 370. The signal TFB may comprise updated configuration settings for the components 112a-112n. The updated configuration settings may be used by the smart cameras 102a-102n to improve an accuracy of determining whether the triggering event 370 has occurred. For example, if the distributed servers 104a-104n analyze the signal SEL and determine that the triggering event 370 was a false positive (e.g., a falling leaf was detected instead of the visitor 62), then the distributed servers 104a-104n may analyze the signal META to determine how the components 112a-112n may be re-adjusted to prevent detecting another false positive.

The more powerful and/or accurate neural network AI 122 implemented by the distributed servers 104a-104n may provide feedback to the first-stage "triggering event" detection performed by the smart cameras 102a-102n. The feedback provided by the signal TFB may improve the efficiency of the system 100. For example, the improved efficiency may be a reduction in the amount of data (e.g., the selected images) being sent by the smart cameras 102a-102n to the distributed servers 104a-104n. The feedback provided by the signal TFB may further restrain the amount of data communicated without reducing an accuracy of the detections.

In one example, the PIR sensors 164a-164b may be one of the components 112a-112n used to determine the triggering event 370. If the triggering event 370 is determined by the neural network AI module 122 to be a false positive, then the signal TFB may provide feedback to reduce a sensitivity parameter for the PIR sensors 164a-164b. In another example, the microphone 240 and/or the audio processing module 244 may be the components 112a-112n used to determine the triggering event 370. If the triggering event 370 is determined by the neural network AI module 122 to be an object of interest, then the signal TFB may provide feedback to adjust the frequencies used to provide more accurate detection.

In the example shown, the signal SEL and the signal META are shown as separate communications for illustrative purposes. In some embodiments, the smart cameras 102a-102n may embed the meta-data in the selected images. Embedding the meta-data may enable the data sent to the distributed servers 104a-104n to also include the detection parameters for the components 112a-112n such as detection sensitivity thresholds, algorithmic parameters, and any other information used by the smart cameras 102a-102n to determine the triggering event 370. The meta-data may be used to provide feedback back to the particular one of the smart cameras 102a-102n that detected the triggering event 370. After making a determination of whether the images actually contain an event and/or object of interest, the distributed servers 104a-104n may then generate the feedback TFB to the particular one of the smart camera 102a-102n to adjust the local detection parameters of the components 112a-112n and/or the processor 114 to increase efficiency and reduce the amount of data sent throughout the system 100. In some embodiments, the feedback TFB may occur online (e.g., in real-time along with the response CV). In some embodiments, the distributed servers 104a-104n may be configured to batch process across many different smart cameras 102a-102n after processing the selected images SEL and providing the response CV.

Figure 11:
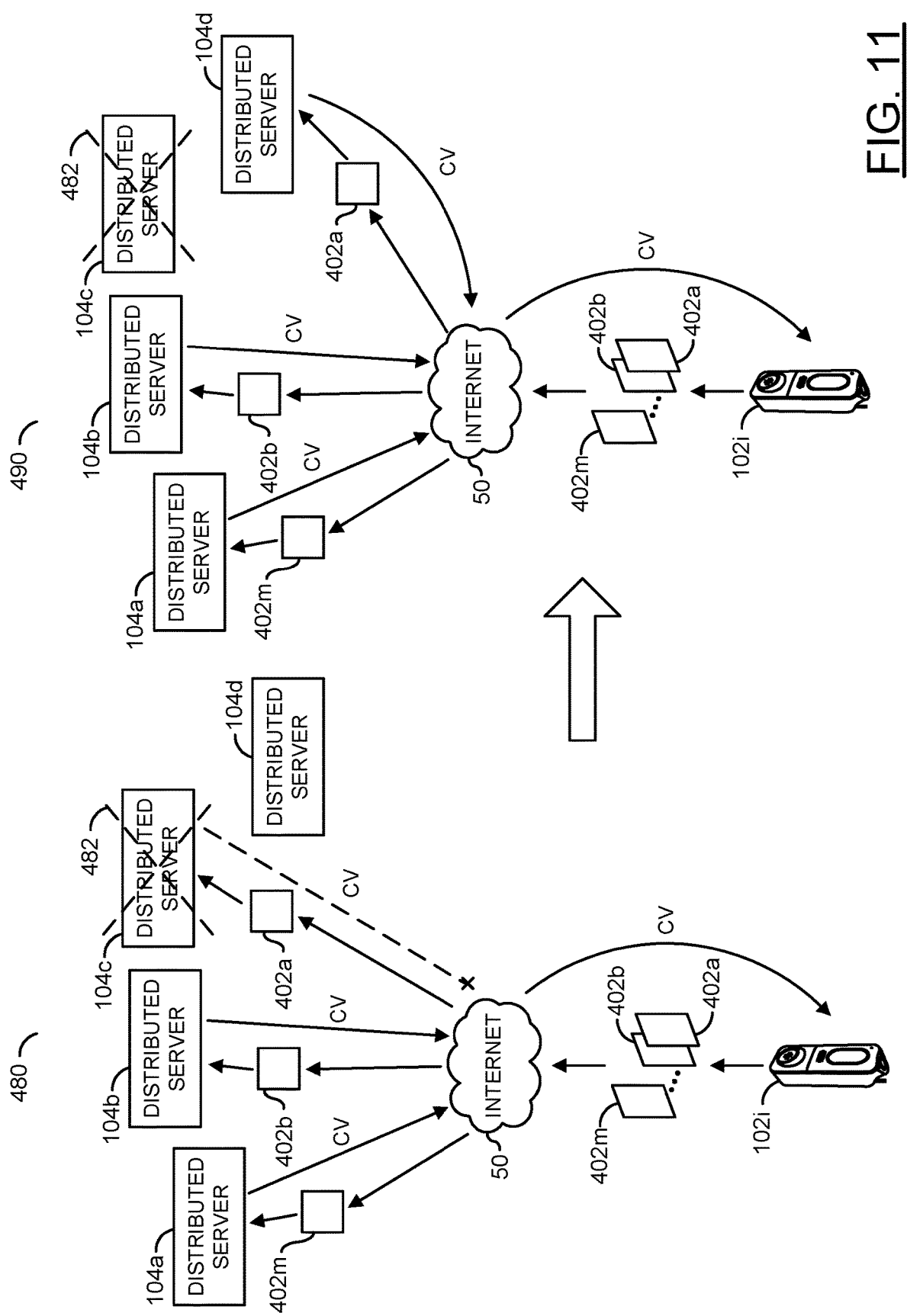
FIG. 11 is a diagram illustrating performing a server failover.

Referring to FIG. 11, a diagram illustrating performing a server failover is shown. An example scenario 480 and an example scenario 490 are shown. The example scenario 490 may occur after the example scenario 480. Both the example scenario 480 and the example scenario 490 may comprise the smart camera 102i uploading the selected images 402a-402m to the distributed servers 104a-104d via the network 50 (e.g., the distributed servers 104a-104d pulling the selected images 402a-402m from the upload queue of the smart camera 102i), and then the distributed servers 104a-104d communicating the response CV back to the smart camera 102i. While the selected images 402a-402m are shown, the example scenario 480 and the example scenario 490 may also communicate the compressed video frames 430-430m and/or the composite video frames 450a-450m.

In the example scenario 480, the selected image 402m is shown communicated to the distributed server 104a, the selected image frame 402b is shown communicated to the distributed server 104b and the selected image frame 402a is shown communicated to the distributed server 104c. For illustrative purposes, in the example scenario 480, one of the selected video frames 402a-402m is shown being presented to one of the distributed servers 104a-104d. However, each of the distributed servers 104a-104d may receive more than one of the selected video frames 402a-402m.

Generally, for uploading a video stream, such as the video frames 360a-360n, one video stream has to be continually processed by a single server. For example, while the distributed servers 104a-104n may process multiple video streams in parallel, all of the video frames 360a-360n for a particular video stream would have to be processed by one particular server (e.g., the distributed server 104a may have to process one entire video stream). Unlike a video stream, which has to be continuously processed by a single server, the selected images 402a-402m may be spread among multiple, independent server computers of the distributed servers 104a-104n. For example, the selected images 402a-402m may be distributed to the distributed servers 104a-104n using a queue and/or other distribution method. Distributing the selected images 402a-402m among multiple servers may enable the distributed servers 104a-104n to process each (or some of) the selected images 402a-402m in parallel. If the neural network AI modules 122 from any of the distributed servers 104a-104n detects an object of interest in any of the selected images 402a-402m, the signal CV may be generated to send a notification and/or any other desired action. Distributing the selected images 402a-402m among the distributed servers 104a-104n may enable the system 100 to have a better response time for the video analysis compared to processing an entire video clip. For example, the system 100 may provide a real-time response to the selected images 402a-402m.

In the example scenario 480, the distributed server 104c may become unavailable (e.g., server failure, communication link failure, etc.). The distributed server 104c may be unable to provide the response signal CV to the smart camera 102i. If the distributed server 104c were processing an entire video stream, the entire video stream would need to be re-communicated to another server, which may cause a significant delay in generating a response.

In the example scenario 490, the selected image 402m is shown communicated to the distributed server 104a, the selected image frame 402b is shown communicated to the distributed server 104b and the selected image frame 402a is shown communicated to the distributed server 104d. The system 100 may be configured to implement a failover contingency in response to the failure of one of the distributed servers 104a-104n. In the example shown, in response to the unavailability of the distributed server 104c for processing the selected image 402a, the smart camera 102i may re-communicate the selected image 402a to another one of the distributed servers (e.g., the distributed server 104d may pull the selected image 402a from the upload queue). The distributed server 104d may successfully process the selected image 104a and generate the response CV for the smart camera 102i. The system 100 may be configured to perform a failover by communicating one (or some) of the selected images 402a-402m to another of the distributed servers 104a-104n.

Distributing the selected images 402a-402m to multiple of the distributed servers 104a-104n in parallel may make the system 100 more robust because the distributed servers 104a-104n may be independent. One or more of the distributed servers 104a-104n may fail without needing to "switch" the video connections from one server to another server because the other servers will simply continue to receive images. For example, the delay for switching the selected image 402a from the distributed server 104c to the distributed server 104d may be insignificant (e.g., negligible) compared to having to switch the entire video stream 360a-360n from the distributed server 104c to the distributed server 104d.

Distributing the selected images 402a-402m across multiple of the distributed servers 104a-104n may reduce cost by allowing the distributed servers 104a-104n to be activated dynamically in response to the load of the incoming selected images 402a-402m. New servers may be activated to handle incoming load without having to connect to specific smart cameras 102a-102n. For example, if there are too many of the distributed servers 104a-104n operating compared to the load requirements, then some may be shut down without disrupting service to any particular smart cameras 102a-102n.

Figure 12:
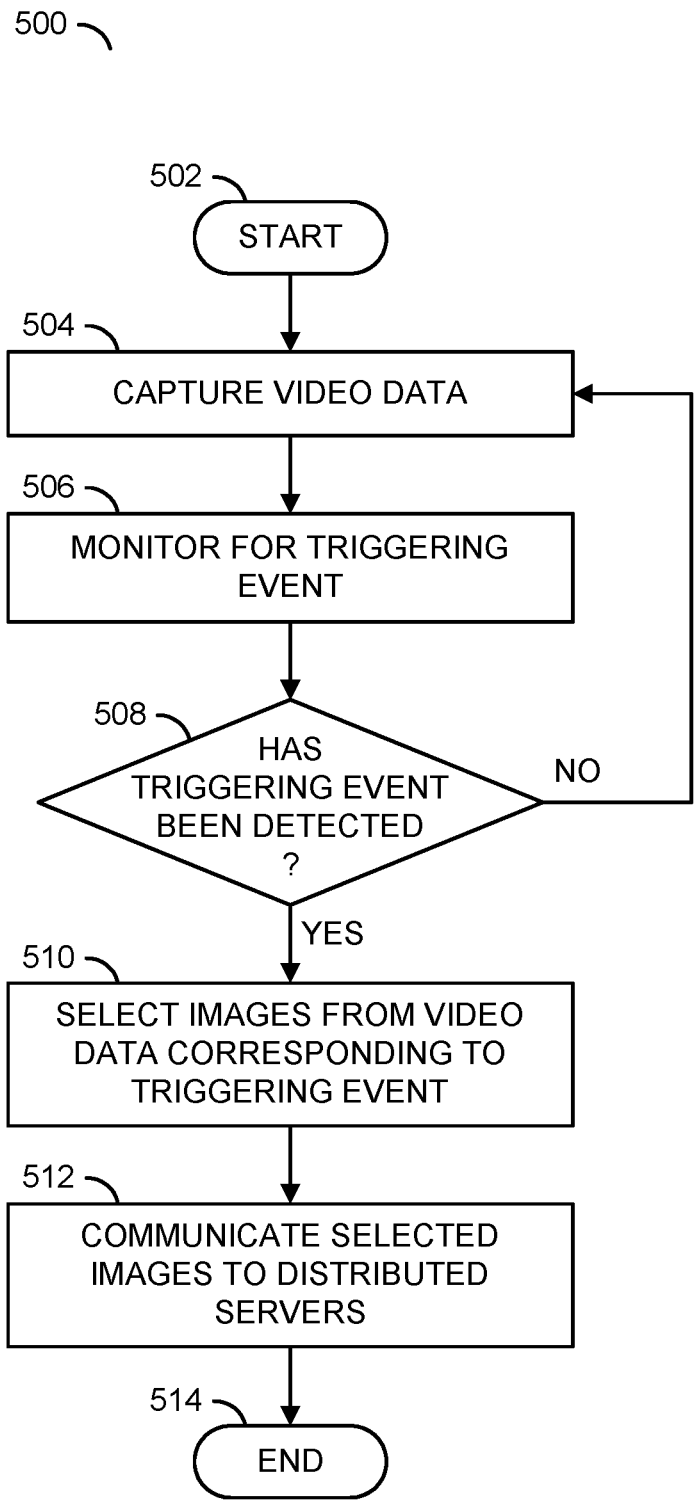
FIG. 12 is a flow diagram illustrating a method for selecting images to upload in response to a triggering event.

Referring to FIG. 12, a method (or process) 500 is shown. The method 500 may select images to upload in response to a triggering event. The method 500 generally comprises a step (or state) 502, a step (or state) 504, a step (or state) 506, a decision step (or state) 508, a step (or state) 510, a step (or state) 512, and a step (or state) 514.

The step 502 may start the method 500. Next, in the step 504, one or more of the smart cameras 102a-102n may capture video data. In an example, the image sensors 234a-234b and/or the processor 114 may generate the video frames 360a-360j, which may be stored in the upload buffer 350. Next, in the step 506, the processor 114 may monitor the input captured by the sensors 112a-112n (or the video data generated by the processor 114) for the triggering event 370. In one example, the processor 114 may detect the triggering event 370 (e.g., motion) in the video frame 360i. In another example, one of the sensors 112a-112n may be the microphone 240 and the processor 114 may monitor the input captured by the microphone 240 for a particular audio level and/or audio frequencies. Next, the method 500 may move to the decision step 508.

In the decision step 508, the processor 114 may determine whether the triggering event 370 has been detected. For example, each of the smart cameras 102a-102n may independently monitor the respective video data captured for triggering events. The processor 114 of each of the smart cameras 102a-102n may monitor the input captured by the sensors 112a-112n to determine whether the sensor output is above a pre-determined threshold and/or meets a particular criteria (e.g., the audio processor 244 detects a particular keyword, the PIR sensors 164a-164b detect a particular amount of motion, the processor 114 detects a face of a visitor, a pre-determined amount of time has passed, etc.). If the triggering event 370 has not been detected, the method 500 may return to the step 504. If the triggering event has been detected, the method 500 may move to the step 510.

In the step 510, the processor 114 may select the selected images 402a-402m from the video frames 360a-360n that correspond to the triggering event 370. For example, the processor 114 may select the video frames that are stored in the upload buffer 350 that have a timestamp that is temporally close to the time of the triggering event 370 (e.g., video frames from before and after the time of the triggering event 370 may be selected). Next, in the step 512, the communication module 232 may communicate (e.g., upload) the selected images 402a-402m to the distributed servers 104a-104n. The smart cameras 102a-102n may continue to record and/or monitor for new triggering events while waiting for the distributed servers 104a-104n to provide a response to confirm whether that the triggering event 370 was accurately detected. Next, the method 500 may move to the step 514. The step 514 may end the method 500.

Figure 13:
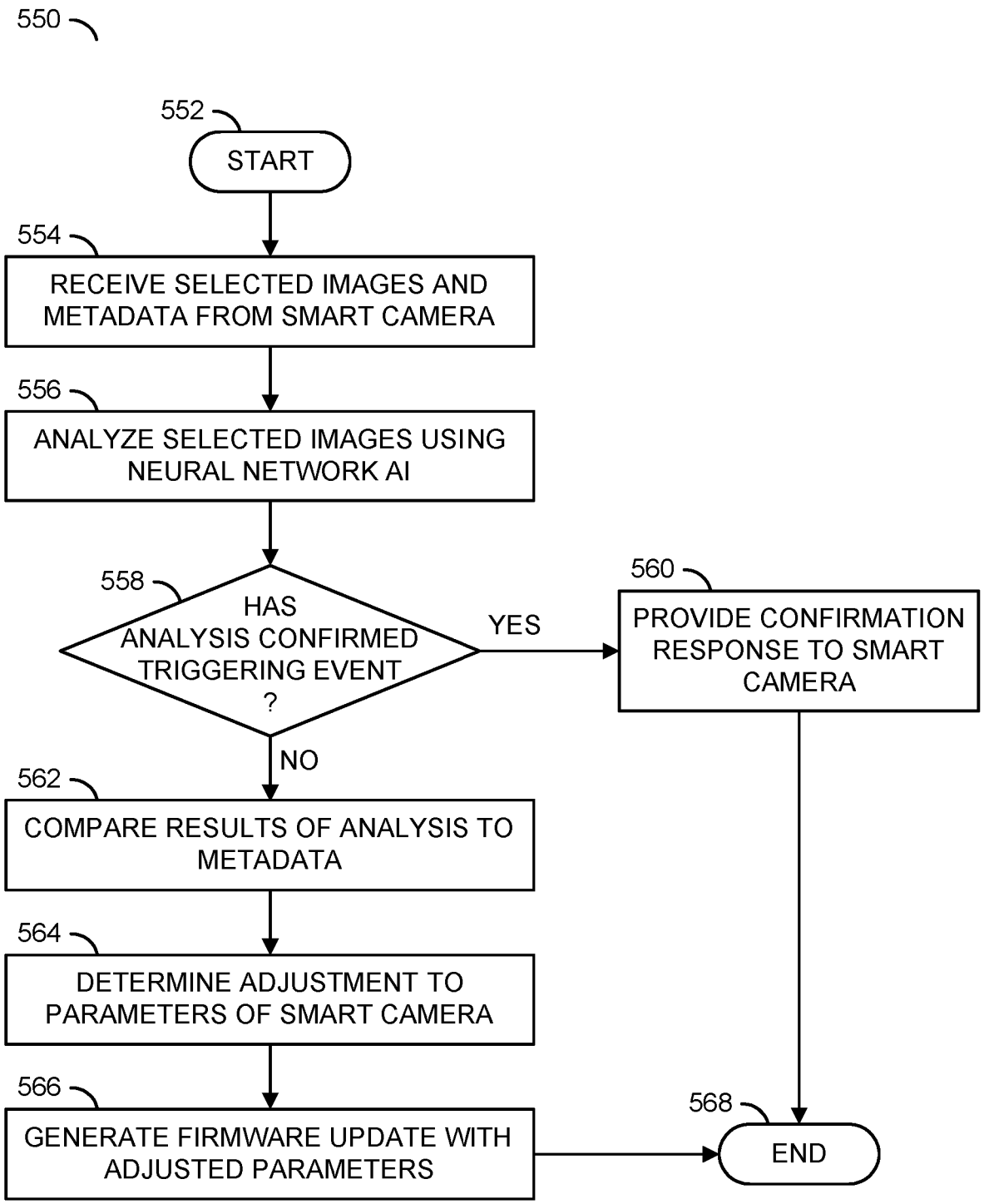
FIG. 13 is a flow diagram illustrating a method for analyzing selected images to confirm a triggering event.

Referring to FIG. 13, a method (or process) 550 is shown. The method 550 may analyze selected images to confirm a triggering event. The method 550 generally comprises a step (or state) 552, a step (or state) 554, a step (or state) 556, a decision step (or state) 558, a step (or state) 560, a step (or state) 562, a step (or state) 564, a step (or state) 566, and a step (or state) 568.

The step 552 may start the method 550. Next, in the step 554, the distributed servers 104a-104n may receive the selected images 402a-402m (e.g., the signal FRAMES) and/or the metadata (e.g., the signal META) from one or more of the smart cameras 102a-102n. In the step 556, the neural network artificial intelligence module 122 implemented by the GPU 120 of the distributed servers 104a-104n (one, some or all of the distributed servers 104a-104n may be active) may analyze the selected images 402a-402m. For example, each of the distributed servers 104a-104n may receive and/or analyze the selected images 402a-402n and/or the associated metadata from more than one of the smart cameras 102a-102n (e.g., smart cameras from the same user, smart cameras from different users, etc.). The selected images 402a-402n may not necessarily be provided in order. For example, the distributed servers 104a-104n may perform the analysis on a first-in first-out basis. For example, each of the selected images 402a-402m and/or the metadata may comprise a device ID to associate the data with the device that sent the data. The selected images 402a-402m from each of the smart cameras 102a-102n may be queued by the distributed servers 104a-104n to enable the additional detection (e.g., confirmation) performed by the neural network artificial intelligence module 122 to be performed in real-time without disrupting service to a particular one of the smart cameras 102a-102n. Next, the method 550 may move to the decision step 558.

In the decision step 558, the neural network artificial intelligence module 122 may determine whether the analysis of the selected video frames 402a-402m confirms the presence of the triggering event 370. For example, the confirmation may be determined by an additional detection (e.g., using the advanced image analysis) corresponding to the triggering event 370. The results of the analysis of the selected images 402a-402m and/or the metadata that have the same device IDs may be aggregated by the neural network artificial intelligence module 122 to determine a result for each triggering event 370 detected by each of the smart devices 120a-120n. For example, the analysis may perform an object detection to confirm whether the motion detected by the smart cameras 102a-102n was a wild animal (e.g., confirm that the triggering event 370 has occurred) or a leaf blowing past the image sensors 234a-234b (e.g., a false positive detected by the smart cameras 102a-102n). If the analysis has confirmed the triggering event 370, then the method 550 may move to the step 560. In the step 560, the distributed servers 104a-104n may generate the signal CV that provides a confirmation for the smart cameras 102a-102n. Next, the method 550 may move to the step 568.

In the decision step 558, if the analysis has not confirmed the triggering event (e.g., the neural network artificial intelligence 122 determines that a false positive has been detected by the smart cameras 102a-102n), then the method 550 may move to the step 562. In the step 562 the neural network artificial intelligence module 122 may compare the results of the analysis of the selected images 402a-402m with the metadata corresponding to the smart cameras 102a-102n that detected the triggering event 370. Next, in the step 564, the neural network artificial intelligence module 122 may determine an adjustment to one or more parameters of the smart cameras 102a-102n. For example, the neural network artificial intelligence module 122 may use the object detection to determine why the smart cameras 102a-102n detected a false positive (e.g., the motion threshold for the PIR sensors 164a-164b is set too low, the volume sensitivity of the microphone 240 is set too low, the feature detection performed by the processor 114 for object detection is not up to date, etc.). In the step 566, the distributed servers 104a-104n may generate a firmware update (e.g., the signal TFB) for the for the corresponding smart cameras 102a-102n to provide the adjusted parameters. Next, the method 550 may move to the step 568. The step 568 may end the method 550.

Figure 14:
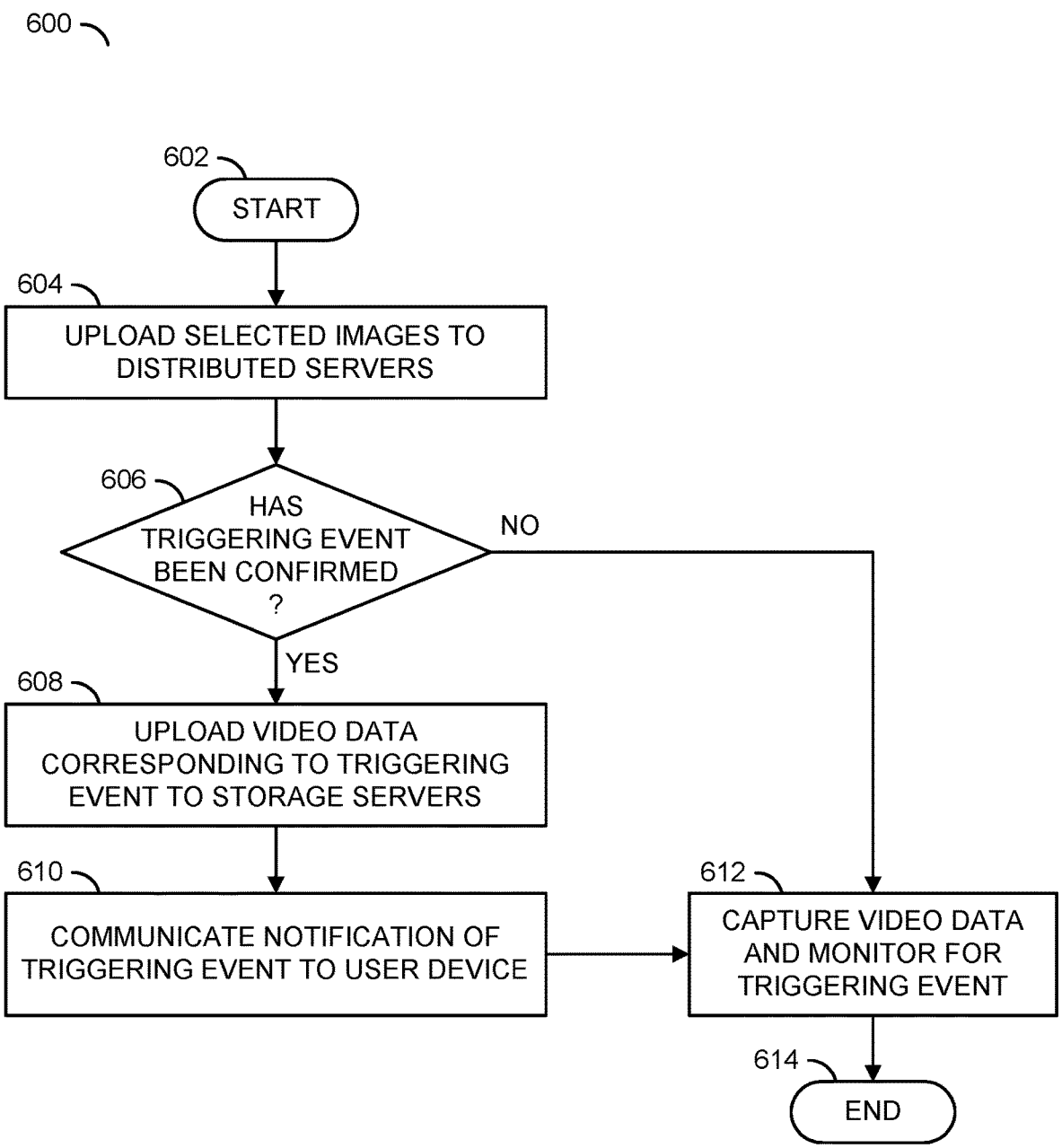
FIG. 14 is a flow diagram illustrating a method for storing video data in response to a confirmation of a triggering event.

Referring to FIG. 14, a method (or process) 600 is shown. The method 600 may store video data in response to a confirmation of a triggering event. The method 600 generally comprises a step (or state) 602, a step (or state) 604, a decision step (or state) 606, a step (or state) 608, a step (or state) 610, a step (or state) 612, and a step (or state) 614.

The step 602 may start the method 600. In the step 604, the communications module 232 may upload the selected images 402a-402m (or the compressed images 430a-430m, or the composite video frames 450a-450m) to the distributed servers 104a-104n. Next, in the decision step 606, the neural network artificial intelligence module 122 may determine whether the triggering event 370 has been confirmed using the additional detection. If the triggering event 370 has not been confirmed, the method 600 may move to the step 612. If the triggering event 370 has been confirmed, then the method 600 may move to the step 608.

In the step 608, the communications module 232 may upload the video data (e.g., each of the captured video frames 360a-360n as the signal FRAMES) to the storage servers 108a-108n. For example, in response to receiving the confirmation (e.g., the signal CV) indicating that the triggering event 370 has been confirmed, the smart cameras 102a-102n may store the video data that corresponds to the time of the triggering event 370 to long term storage. Next, in the step 610, the communications module 232 may communicate a real-time notification of the triggering event 370 to the user device 106 (e.g., "Your daughter has been detected at the front door at 4:32 PM", "A raccoon has been detected near your garbage cans", "A package has been delivered at 12:45 PM", etc.). For example, in response to receiving the confirmation (e.g., the signal CV) indicating that the triggering event 370 has been confirmed, the smart cameras 102a-102n may provide a real-time notification that corresponds to the time of the triggering event 370 to the end user. In the step 612, the smart cameras 102a-102n may continue capturing the video data and/or monitoring for triggering events. Next, the method 600 may move to the step 614. The step 614 may end the method 600.

Figure 15:
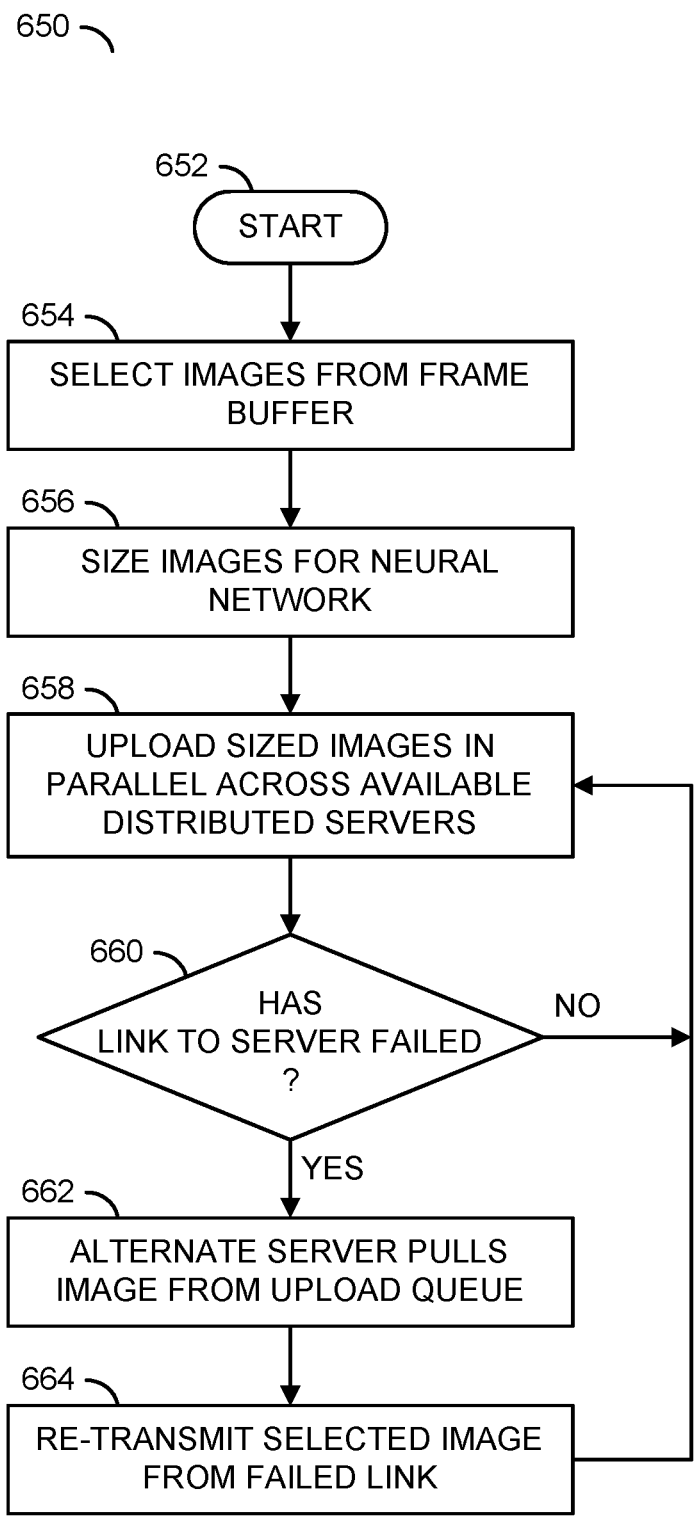
FIG. 15 is a flow diagram illustrating a method for switching to an alternate server.

Referring to FIG. 15, a method (or process) 650 is shown. The method 650 may switch to an alternate server in response to a failure. The method 650 generally comprises a step (or state) 652, a step (or state) 654, a step (or state) 656, a step (or state) 658, a decision step (or state) 660, a step (or state) 662, and a step (or state) 664.

The step 652 may start the method 650. In the step 654, the processor 114 may select the selected images 402a-402m from the upload buffer 350. Next, in the step 656, the processor 114 may size the selected image for the neural network. In some embodiments, the neural network artificial intelligence module 122 may operate on images having a fixed resolution (e.g., a resolution smaller than the resolution of the video frames 360a-360n captured by the image sensors 234a-234b and/or generated by the processor 114). In an example, the communications module 232 may query the distributed servers 104a-104n for various parameters including the fixed resolution used by the neural network artificial intelligence module 122 and the processor 114 may be configured to re-size the selected images 402a-402m to the fixed resolution before uploading. For example, the re-sized images may be used for uploading to the distributed servers 104a-104n and the originally sized images may be stored for uploading to the storage servers 108a-108n. Next, the method 650 may move to the step 658.

In the step 658, the communications module 232 may upload the selected and/or re-sized images 402a-402m in parallel across the available distributed servers 104a-104n. For example, a first selected image 402a may be presented to a first available distributed server 104a, a second selected image 402c may be presented to a second available distributed server 104f, etc. In one example, the communications module 232 may enter the selected and/or re-sized images 402a-402m into a queue and the distributed servers 104a-104n may pull the selected and/or re-sized images 402a-402m from the queue. Next, the method 650 may move to the decision step 660.

In the decision step 660, the communications module 232 and/or the distributed servers 104a-104n may determine whether a link to one of the distributed servers 104a-104n has failed. In one example, the communications module 232 may detect a server not reachable error (e.g., a 404 error), the communications module 232 may not receive a reply within a pre-determined amount of time, the communications module 232 may receive a notification that a particular server may be unavailable for a particular amount of time, etc. In another example, the distributed servers 104a-104n may determine whether one or more of the distributed servers 104a-104n is offline. If the link to one or more of the distributed servers 104a-104n has not failed, then the method 650 may return to the step 658 (e.g., continue uploading the selected and/or re-sized images 402a-402m until all images have been uploaded and responses have been received). If the link to one or more of the distributed servers 104a-104n has failed (e.g., the selected image 402i has not been able to be analyzed by the distributed server 104j), then the method 650 may move to the step 662.

In the step 662, the distributed servers 104a-104n may replace the server that has gone down with a next available active server (e.g., an alternate server of the distributed servers 104a-104n) and the alternate server may pull the next of the selected and/or re-sized images 402a-402m from the upload queue. In some embodiments, the communications module 232 may find an alternate available one of the distributed servers (e.g., the distributed server 102k may be available). Next, in the step 664, the communications module 232 may re-transmit the selected image and/or re-sized from the failed link to the alternate server (e.g., the selected image 402i may be transmitted to the available distributed server 104k). In another example, the alternate server may pull the next selected and/or re-sized image (e.g., a re-transmission may occur if the original server failed after receiving the selected image 402i or no re-transmission may be performed because the failed server would not have been able to pull the selected and/or re-sized image from the upload queue). Next, the method 600 may return to the step 658.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
   a smart camera configured to (i) capture video data comprising a plurality of video frames, (ii) generate metadata in response to detecting a triggering event and (iii) select a plurality of images from said plurality of video frames of said video data in response to said triggering event and (iv) communicate said plurality of images and said metadata; and
   a server computer configured to (i) receive said plurality of images and said metadata, (ii) analyze said plurality of images to perform an additional detection corresponding to said triggering event, (iii) compare a result of said analysis of said plurality of images to said metadata to determine updated local parameters for said smart camera in response to said additional detection determining a false positive detection, and (iv) generate a signal in response to said additional detection, wherein
   (a) said server computer implements a first neural network for analyzing said plurality of images,
   (b) said smart camera implements a second neural network for detecting said triggering event in response to said local parameters,
   (c) said first neural network uses more computing resources than said second neural network uses for detecting said triggering event,
   (d) said signal comprises said updated local parameters for said smart camera in response to said false positive detection,
   (e) said updated local parameters are generated to update said second neural network to prevent said false positive detection, and
   (f) communicating said plurality of images uses less bandwidth than communicating said video data.

2. The system according to claim 1, wherein said plurality of images are selected periodically from said plurality of video frames.

3. The system according to claim 2, wherein said plurality of images are selected at a rate that is less than a frame rate of said smart camera.

4. The system according to claim 3, wherein said rate for selecting said plurality of images is one frame per second.

5. The system according to claim 2, wherein (i) said smart camera is configured to determine if one of said plurality of images selected periodically has a low quality and (ii) if said one of said plurality of images selected periodically has said low quality said smart camera selects an alternate image from said plurality of video frames.

6. The system according to claim 1, wherein said smart camera is configured to intelligently select said plurality of images based on determining which of said plurality of video frames has a higher probability of providing information that allows for said additional detection.

7. The system according to claim 1, wherein (i) said server computer is one of a plurality of server computers configured as a distributed server, (ii) said distributed server is configured to provision resources based on demand and (iii) said first neural network is enabled by a graphics processing unit provided by said server computers.

8. The system according to claim 7, wherein (i) said smart camera is configured to provide one or more of said plurality of images to a number of said plurality of server computers and (ii) providing said plurality of images to said number of said plurality of server computers enables (a) parallel processing of said plurality of images and (b) said smart camera to select an alternate one of said plurality of server computers if a particular one of said server computers is unavailable.

9. The system according to claim 7, wherein (i) said smart camera is one of a plurality of smart cameras, (ii) said plurality of images and said metadata generated by said plurality of smart cameras are queued for said additional detection among said plurality of server computers and (iii) said distributed server is configured to dynamically adapt to said demand without disrupting service to a particular one of said plurality of smart cameras.

10. The system according to claim 1, wherein (i) said smart camera comprises a memory buffer, (ii) said memory buffer is configured to store a sequence of said plurality of video frames and (iii) said sequence of said plurality of video frames corresponds to a pre-determined length of time of said video data.

11. The system according to claim 10, wherein said plurality of images communicated by said smart camera are (i) selected from said sequence of said plurality of video frames and (ii) based on said plurality of video frames from said sequence that (a) were captured before said triggering event, (b) during said triggering event and (c) after said triggering event.

12. The system according to claim 1, wherein said signal is configured to (i) provide to a user device a real-time notification corresponding to said additional detection and (ii) enable said smart camera to upload said video data corresponding to said triggering event to a remote server.

13. The system according to claim 1, wherein, compared to performing said additional detection on said video data, performing said additional detection on said plurality of images (a) reduces latency and (b) uses fewer computational resources.

14. The system according to claim 1, wherein said updated local parameters are updated as a firmware update for said smart camera.

15. The system according to claim 1, wherein (i) said smart camera generates a composite of said plurality of video frames, (ii) said composite provides motion data from multiple of said plurality of video frames and (iii) said composite is selected as said plurality of images.

16. The system according to claim 1, wherein said smart camera is configured to compress said plurality of images using inter-frame compression.

17. The system according to claim 1, wherein (i) said second neural network is a compressed version of said first neural network and (ii) said second neural network uses less computing resources than said first neural network implemented by said server computer.

18. The system according to claim 1, wherein said triggering event is detected in response to one or more of (a) motion detected by analyzing said video data, (b) motion detected by a passive infrared sensor, (c) identifying a particular sound in response to audio captured by a microphone, (d) detecting a press of a button and (e) a pre-determined amount of time.

19. The system according to claim 1, further comprising a storage server computer implemented separate from said server computer, wherein
   (a) said signal comprises a confirmation feedback of said triggering event in response to said additional detection confirming said triggering event,
   (b) said smart camera is configured to upload a subset of said plurality of video frames that corresponds to said triggering event to said storage server computer in response to said confirmation feedback.

20. The system according to claim 19, wherein said smart camera is configured to update said second neural network with positive feedback for detecting said triggering event in response to said confirmation feedback.

* * * * *